(12) United States Patent
Chen et al.

(10) Patent No.: US 12,225,186 B2
(45) Date of Patent: Feb. 11, 2025

(54) METHOD FOR CONSTRUCTING MERGE CANDIDATE MOTION INFORMATION LIST, APPARATUS, AND CODEC

(71) Applicant: Huawei Technologies Co., Ltd., Guangdong (CN)

(72) Inventors: Xu Chen, Shenzhen (CN); Haitao Yang, Shenzhen (CN); Lian Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 335 days.

(21) Appl. No.: 17/644,603

(22) Filed: Dec. 16, 2021

(65) Prior Publication Data
US 2022/0109830 A1  Apr. 7, 2022

Related U.S. Application Data

(63) Continuation of application No. PCT/CN2020/096362, filed on Jun. 16, 2020.

(30) Foreign Application Priority Data

Jun. 19, 2019  (CN) .......................... 201910531988.7

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/46* (2014.11)

(58) Field of Classification Search
CPC .. H04N 19/105; H04N 19/159; H04N 19/176; H04N 19/46; H04N 19/139; H04N 19/52; H04N 19/513; H04N 19/182
See application file for complete search history.

(56) References Cited

U.S. PATENT DOCUMENTS

2014/0098882 A1  4/2014  Zhang et al.
2016/0219278 A1  7/2016  Chen et al.
(Continued)

FOREIGN PATENT DOCUMENTS

CN   104412587 A   3/2015
CN   103716631 A   4/2017
(Continued)

OTHER PUBLICATIONS

ITU-T H.261 (Mar. 1993), Line Transmission of Non-Telephone Signals, Video Codec for Audiovisual Services at px64 kbits, total 29 pages.
(Continued)

*Primary Examiner* — Tat C Chio
(74) *Attorney, Agent, or Firm* — WOMBLE BOND DICKINSON (US) LLP

(57) ABSTRACT

This application discloses an apparatus for constructing a merge candidate motion information list, including: one or more processors; a non-transitory memory storage comprising instructions which when executed by the one or more processors, cause the apparatus to obtain first motion information and add the first motion information to a first candidate motion information set, to obtain a second candidate motion information set; obtain second motion information based on an HMVP candidate motion information list; when the second motion information is different from all motion information in the second candidate motion information set, add the second motion information to the second candidate motion information set, to obtain a merge candidate motion information list, wherein a quantity of pieces of motion information in the merge candidate motion information set is equal to a preset threshold. Implementing this application reduces complexity in constructing the merge
(Continued)

candidate motion information list, and improve coding efficiency.

20 Claims, 12 Drawing Sheets

(51) Int. Cl.
  *H04N 19/176*  (2014.01)
  *H04N 19/46*  (2014.01)

(56) References Cited

U.S. PATENT DOCUMENTS

| | | | | |
|---|---|---|---|---|
| 2020/0404254 | A1* | 12/2020 | Zhao | H04N 19/70 |
| 2022/0046273 | A1* | 2/2022 | Han | H04N 19/139 |
| 2022/0060687 | A1* | 2/2022 | Jang | H04N 19/573 |

FOREIGN PATENT DOCUMENTS

| | | | |
|---|---|---|---|
| CN | 108353184 | A | 7/2018 |
| CN | 114270847 | A | 4/2022 |
| EP | 3291554 | A1 | 3/2018 |
| WO | 2018206396 | A1 | 11/2018 |

OTHER PUBLICATIONS

ITU-T H.262 (Feb. 2012), Series H: Audiovisual and Multimedia Systems, Infrastructure of audiovisual services—Coding of moving video Information technology—Generic coding of moving pictures and associated audio information: Video: Frame packing arrangement signalling for 3D content, total 238 pages.

ITU-T H.263(Jan. 2005), Series H: Audiovisual and Multimedia Systems, Infrastructure of audiovisual services—Coding of moving video, Video coding for low bit rate communication, total 226 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

Request for Comments: 6386, J. Bankoski et al, VP8 Data Format and Decoding Guide, Nov. 2011, total 304 pages.

Adrian Grange et al, VP9 Bitstream and Decoding Process Specification—v0.6, Mar. 31, 2016, total 171 pages.

\* cited by examiner

CONT. FROM
FIG. 8A

↓ 813

Skip using the first motion information to construct a merge candidate motion information list, obtain an HMVP candidate motion information list, and obtain second motion information based on motion information in the HMVP candidate motion information list

↓ 814

Determine whether the second motion information is different from all the motion information in the first candidate motion information set Yes → 819

Skip using the second motion information to construct the merge candidate motion information list, and add a default value to the first candidate motion information set, to obtain the merge candidate motion information list No ↓ 815

Add the second motion information to the first candidate motion information set, to obtain a fourth candidate motion information set

↓ 816

Determine whether a quantity of pieces of motion information in the fourth candidate motion information set is less than the preset threshold Yes → 818

Add a default value to the fourth candidate motion information set, to obtain the merge candidate motion information list No ↓ 817

Use the fourth candidate motion information set as the merge candidate motion information list

FIG. 8C

METHOD FOR CONSTRUCTING MERGE CANDIDATE MOTION INFORMATION LIST, APPARATUS, AND CODEC

CROSS-REFERENCE TO RELATED APPLICATIONS

This application is a continuation of International Application No. PCT/CN2020/096362, filed on Jun. 16, 2020, which claims priority to Chinese Patent Application No. 201910531988.7, filed on Jun. 19, 2019. The disclosures of the aforementioned applications are hereby incorporated by reference in their entireties.

TECHNICAL FIELD

Embodiments the disclosure relates to the field of video coding technologies, and in particular, to a method for constructing a merge candidate motion information list, an apparatus, and a codec.

BACKGROUND

Digital video capabilities can be incorporated into a wide variety of apparatuses, including digital televisions, digital live broadcast systems, wireless broadcast systems, personal digital assistants (PDAs), laptop or desktop computers, tablet computers, e-book readers, digital cameras, digital recording apparatuses, digital media players, video game apparatuses, video game consoles, cellular or satellite radio phones (also referred to as "smartphones"), video conferencing apparatuses, video streaming apparatuses, and the like. Digital video apparatuses implement video compression technologies, for example, video compression technologies described in standards including MPEG-2, MPEG-4, ITU-T H.263, and ITU-T H.264/MPEG-4 part 10 advanced video coding (AVC), the video coding standard H.265/high efficiency video coding (HEVC) standard, and extensions of these standards. The video apparatuses can transmit, receive, encode, decode, and/or store digital video information more efficiently by implementing the video compression technologies.

The video compression technologies are used to perform spatial (intra-picture) prediction and/or temporal (inter-picture) prediction to reduce or remove inherent redundancy in video sequences. In block-based video coding, a video slice (namely, a video frame or a part of the video frame) may be partitioned into image blocks, and the image block may also be referred to as a tree block, a coding unit (CU), and/or a coding node. An image block in a to-be-intra-coded (I) slice of a picture is coded through spatial prediction based on a reference sample in a neighboring block in the same image. For an image block in a to-be-inter-coded (P or B) slice of the image, spatial prediction based on a reference sample in a neighboring block in the same image or temporal prediction based on a reference sample in another reference image may be used. An image may be referred to as a frame, and a reference image may be referred to as a reference frame.

An inter prediction method includes a merge mode. A candidate motion information list needs to be maintained. Before new motion information is added to the candidate motion information list, it needs to be checked whether there is motion information that is the same as the new motion information in the list. If there is motion information that is the same as the new motion information in the list, the new motion information is not added to the list. Generally, the checking process is referred to as pruning of the candidate motion information list. The purpose of the checking is to prevent motion information that is the same as motion information in the list from being added to the list and avoid redundant calculation of rate distortion cost (RD cost). In related technologies, in a process of constructing the candidate motion information list in the merge mode, in addition to a conventional method for determining, based on spatial candidates and temporal candidates, candidate motion information to be added to the list, there are also methods for determining candidate motion information to be added to the list, for example, a history-based motion vector prediction (HMVP) method and a pairwise method.

However, a determining process in the foregoing method is complex. Consequently, coding performance is affected.

SUMMARY

Embodiments of this disclosure provide a method for constructing a merge candidate motion information list, an apparatus, and a codec, to improve prediction accuracy of motion information of an image block to some extent, and improve coding performance.

According to a first aspect, an embodiment of this application provides a method for constructing a merge candidate motion information list. The method includes:

obtaining a first candidate motion information set, where the first candidate motion information set includes motion information of a spatially neighboring block of a current block and/or motion information of a temporally neighboring block of the current block; when a quantity of pieces of motion information in the first candidate motion information set is less than a preset threshold, obtaining first motion information based on the motion information in the first candidate motion information set; when the first motion information is different from all the motion information in the first candidate motion information set, adding the first motion information to the first candidate motion information set, to obtain a second candidate motion information set; when a quantity of pieces of motion information in the second candidate motion information set is less than the preset threshold, obtaining a history-based motion vector prediction (HMVP) candidate motion information list, and obtaining second motion information based on motion information in the HMVP candidate motion information list; when the second motion information is different from all the motion information in the second candidate motion information set, adding the second motion information to the second candidate motion information set, to obtain a third candidate motion information set; and when a quantity of pieces of motion information in the third candidate motion information set is equal to the preset threshold, using the third candidate motion information set as the merge candidate motion information list.

In this embodiment of the disclosure, after the first candidate motion information set is obtained, the first motion information is first determined, and then the second motion information is determined. If the quantity of pieces of motion information in the third candidate motion information set obtained by adding the first motion information and the second motion information directly reaches the preset threshold, subsequent operations do not need to be performed. This can reduce complexity in constructing the merge candidate motion information list, and avoid a result of low-efficient output resulting from using default values to construct the merge candidate motion information list.

In an embodiment, after the second candidate motion information set is obtained, the method further includes: when the quantity of pieces of motion information in the second candidate motion information set is equal to the preset threshold, using the second candidate motion information set as the merge candidate motion information list.

In this embodiment of this application, after the first candidate motion information set is obtained, the first motion information is determined. If the first motion information may be used to construct the merge candidate motion information list, and the quantity of pieces of motion information in the second candidate motion information set obtained by adding the first motion information to the first candidate motion information set directly reaches the preset threshold, subsequent operations do not need to be performed. This can reduce complexity in constructing the merge candidate motion information list, and avoid a result of low-efficient output resulting from using default values to construct the merge candidate motion information list.

In an embodiment, after the third candidate motion information set is obtained, the method further includes: when the quantity of pieces of motion information in the third candidate motion information set is less than the preset threshold, adding default values to the third candidate motion information set, to obtain the merge candidate motion information list.

In an embodiment, after the obtaining first motion information based on the motion information in the first candidate motion information set, the method further includes: when the first motion information is the same as at least one piece of motion information in the first candidate motion information set, skipping using the first motion information to construct the merge candidate motion information list; obtaining the HMVP candidate motion information list, and obtaining the second motion information based on the motion information in the HMVP candidate motion information list; when the second motion information is different from all the motion information in the first candidate motion information set, adding the second motion information to the first candidate motion information set, to obtain a fourth candidate motion information set; and when a quantity of pieces of motion information in the fourth candidate motion information set is equal to the preset threshold, using the fourth candidate motion information set as the merge candidate motion information list.

In an embodiment, after the fourth candidate motion information set is obtained, the method further includes: when the quantity of pieces of motion information in the fourth candidate motion information set is less than the preset threshold, adding default values to the fourth candidate motion information set, to obtain the merge candidate motion information list.

In this embodiment of this application, if a quantity of pieces of motion information in a list to which the first motion information and/or the second motion information is added does not reach the preset threshold, the list needs to be padded with default values until a length of the list reaches the preset threshold, that is, until it is determined that the list is the merge candidate motion information list.

In an embodiment, after the obtaining second motion information based on motion information in the HMVP candidate motion information list, the method further includes: when the second motion information is the same as at least one piece of motion information in the first candidate motion information set, skipping using the second motion information to construct the merge candidate motion information list; and adding default values to the first candidate motion information set, to obtain the merge candidate motion information list.

In an embodiment, after the obtaining second motion information based on motion information in the HMVP candidate motion information list, the method further includes: when the second motion information is the same as at least one piece of motion information in the second candidate motion information set, skipping using the second motion information to construct the merge candidate motion information list; and adding default values to the second candidate motion information set, to obtain the merge candidate motion information list.

In an embodiment, the obtaining first motion information based on the motion information in the first candidate motion information set includes: selecting two pieces of motion information from the first candidate motion information set that are determined based on a preset combination manner, and obtaining the first motion information based on the two pieces of motion information.

In an embodiment, when the motion information is a motion vector, the first motion information is a first motion vector, and the obtaining the first motion information based on the two pieces of motion information includes: using an average value of the two motion vectors as the first motion vector.

In an embodiment, the obtaining second motion information based on motion information in the HMVP candidate motion information list includes: selecting motion information from the HMVP candidate motion information list as the second motion information.

According to a second aspect, an embodiment of this application provides an inter prediction apparatus, including:

a processing module, configured to: obtain a first candidate motion information set, where the first candidate motion information set includes motion information of a spatially neighboring block of a current block and/or motion information of a temporally neighboring block of the current block; when a quantity of pieces of motion information in the first candidate motion information set is less than a preset threshold, obtain first motion information based on the motion information in the first candidate motion information set; when the first motion information is different from all the motion information in the first candidate motion information set, add the first motion information to the first candidate motion information set, to obtain a second candidate motion information set; when a quantity of pieces of motion information in the second candidate motion information set is less than the preset threshold, obtain a history-based motion vector prediction (HMVP) candidate motion information list, and obtain second motion information based on motion information in the HMVP candidate motion information list; when the second motion information is different from all the motion information in the second candidate motion information set, add the second motion information to the second candidate motion information set, to obtain a third candidate motion information set; and when a quantity of pieces of motion information in the third candidate motion information set is equal to the preset threshold, use the third candidate motion information set as the merge candidate motion information list.

In an embodiment, the processing module is further configured to: when the quantity of pieces of motion information in the second candidate motion information set is equal to the preset threshold, use the second candidate motion information set as the merge candidate motion information list.

In an embodiment, the processing module is further configured to: when the quantity of pieces of motion information in the third candidate motion information set is less than the preset threshold, add default values to the third candidate motion information set, to obtain the merge candidate motion information list.

In an embodiment, the processing module is further configured to: when the first motion information is the same as at least one piece of motion information in the first candidate motion information set, skip using the first motion information to construct the merge candidate motion information list; obtain the HMVP candidate motion information list, and obtain the second motion information based on the motion information in the HMVP candidate motion information list; when the second motion information is different from all the motion information in the first candidate motion information set, add the second motion information to the first candidate motion information set, to obtain a fourth candidate motion information set; and when a quantity of pieces of motion information in the fourth candidate motion information set is equal to the preset threshold, use the fourth candidate motion information set as the merge candidate motion information list.

In an embodiment, the processing module is further configured to: when the quantity of pieces of motion information in the fourth candidate motion information set is less than the preset threshold, add default values to the fourth candidate motion information set, to obtain the merge candidate motion information list.

In an embodiment, the processing module is further configured to: when the second motion information is the same as at least one piece of motion information in the first candidate motion information set, skip using the second motion information to construct the merge candidate motion information list; and add default values to the first candidate motion information set, to obtain the merge candidate motion information list.

In an embodiment, the processing module is further configured to: when the second motion information is the same as at least one piece of motion information in the second candidate motion information set, skip using the second motion information to construct the merge candidate motion information list; and add default values to the second candidate motion information set, to obtain the merge candidate motion information list.

In an embodiment, the processing module is configured to: select two pieces of motion information from the first candidate motion information set that are determined based on a preset combination manner, and obtain the first motion information based on the two pieces of motion information.

In an embodiment, when the motion information is a motion vector, the first motion information is a first motion vector, the processing module is configured to use an average value of the two motion vectors as the first motion vector.

In an embodiment, the processing module is configured to select motion information from the HMVP candidate motion information list as the second motion information.

According to a third aspect, an embodiment of this application provides a video encoder. The video encoder is configured to encode an image block, and includes:

the inter prediction apparatus according to any one of the implementations of the second aspect or the second aspect, where the inter prediction apparatus is configured to: after constructing a merge candidate motion information list, predict motion information of a current encoding image block based on target candidate motion information that is determined from the merge candidate motion information list; and determine predicted pixel values of the current encoding image block based on the motion information of the current encoding image block;

an entropy encoding module, configured to encode an index flag of the target candidate motion information into a bitstream, where the index flag indicates the target candidate motion information used for the current encoding image block; and a reconstruction module, configured to reconstruct the current encoding image block based on the predicted pixel values.

According to a fourth aspect, an embodiment of this application provides a video decoder. The video decoder is configured to decode a bitstream to obtain an image block, and includes:

an entropy decoding module, configured to decode the bitstream to obtain an index flag, where the index flag is used to indicate target candidate motion information of a current decoding image block;

the inter prediction apparatus according to any one of the implementations of the second aspect or the second aspect, where the inter prediction apparatus is configured to: after constructing a merge candidate motion information list, query, based on the index flag, the merge candidate motion information list for corresponding target candidate motion information to predict motion information of a current decoding image block, and determine predicted pixel values of the current decoding image block based on the motion information of the current decoding image block; and a reconstruction module, configured to reconstruct the current decoding image block based on the predicted pixel values.

According to a fifth aspect, an embodiment of this application provides a video coding device. The video coding device includes a nonvolatile memory and a processor that are coupled to each other. The processor invokes program code stored in the memory to perform the method in any one of the implementations of the first aspect or the first aspect.

According to a sixth aspect, an embodiment of this application provides a computer-readable storage medium. The computer-readable storage medium stores program code, and the program code includes instructions used to perform a part of or all operations of any method in the first aspect.

According to a seventh aspect, an embodiment of this application provides a computer program product. When the computer program product runs on a computer, the computer is enabled to perform a part of or all operations of any method in the first aspect.

It should be understood that technical solutions in the second aspect to the seventh aspect of this application are consistent with the technical solutions in the first aspect of this application. Beneficial effects achieved by the various aspects and corresponding implementations are similar, and details are not described again.

It can be learned that, in the embodiments of the disclosure, after the first candidate motion information set is obtained, the first motion information is first determined, and then the second motion information is determined. If the quantity of pieces of motion information in the third candidate motion information set obtained by adding the first motion information and the second motion information directly reaches the preset threshold, subsequent operations do not need to be performed. This can reduce complexity in constructing the merge candidate motion information list, and avoid a result of low-efficient output resulting from using default values to construct the merge candidate motion information list.

BRIEF DESCRIPTION OF DRAWINGS

To describe the technical solutions in the embodiments of the disclosure or the background more clearly, the following describes the accompanying drawings in the embodiments of the disclosure or the background.

FIG. 8A to FIG. 8C are still another schematic flowchart of a method for constructing a merge candidate motion information list for implementing an embodiment of this application.

DESCRIPTION OF EMBODIMENTS

Figure 1A:
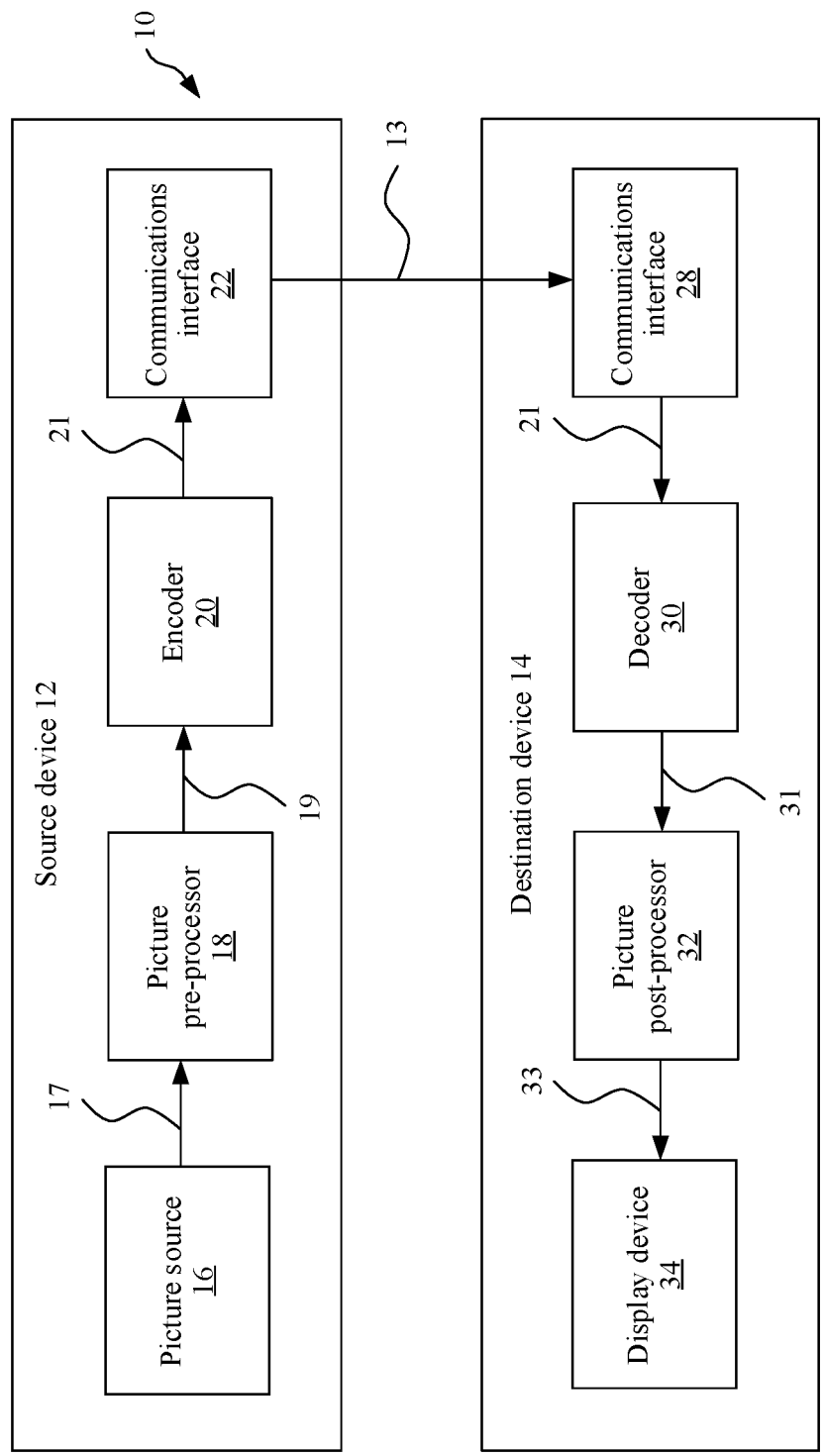
FIG. 1A is a block diagram of an example video coding system 10 for implementing an embodiment of the disclosure.

The following describes the embodiments of the disclosure with reference to the accompanying drawings in the embodiments of the disclosure. In the following description, reference is made to the accompanying drawings that form a part of this disclosure and show, by way of illustration, specific aspects of the embodiments of the disclosure or specific aspects in which the embodiments of the disclosure may be used. It should be understood that the embodiments of the disclosure may be used in other aspects, and may include structural or logical changes not depicted in the accompanying drawings. Therefore, the following detailed description shall not be understood in a limiting sense, and the scope of the disclosure is defined by the appended claims. For example, it should be understood that disclosed content with reference to described methods may also hold true for a corresponding device or system configured to perform the method, and vice versa. For example, if one or more specific method operations are described, a corresponding device may include one or more units such as functional units for performing the described one or more method operations (for example, one unit performs one or more operations; or a plurality of units, each of which performs one or more of the plurality of operations), even if such one or more units are not explicitly described or illustrated in the accompanying drawings. In addition, for example, if a specific apparatus is described based on one or more units such as a functional unit, a corresponding method may include a operation used to perform one or more functionalities of one or more units (for example, one operation used to perform one or more functionalities of one or more units; or a plurality of operations, each of which is used perform one or more functionalities of one or more units in a plurality of units), even if such one or more of operations are not explicitly described or illustrated in the accompanying drawings. Further, it should be understood that features of the various example embodiments and/or aspects described in this specification may be combined with each other, unless otherwise specified.

The technical solutions in the embodiments of the disclosure may not only be applied to existing video coding standards (for example, standards such as H.264 and HEVC), but also be applied to future video coding standards (for example, the standard H.266). Terms used in embodiments of the disclosure are merely intended to explain specific embodiments of the disclosure, but are not intended to limit the disclosure. The following first briefly describes some concepts that may be used in the embodiments of the disclosure.

Video coding typically refers to processing of a sequence of pictures that constitute a video or a video sequence. In the field of video coding, the terms "picture", "frame", and "image" may be used as synonyms. Video coding used in this specification refers to video encoding or video decoding. Video encoding is performed on a source side, and usually includes processing (for example, by compressing) an original video picture to reduce an amount of data for representing the video picture, for more efficient storage and/or transmission. Video decoding is performed on a destination side, and typically includes inverse processing in comparison with processing performed by an encoder to reconstruct a video picture. "Coding" of a video picture in the embodiments should be understood as "encoding" or "decoding" of a video sequence. A combination of encoding components and decoding components is also referred to as codec (codec).

A video sequence includes a series of pictures, a picture is further split into slices, and a slice is further split into blocks. Video coding is performed by blocks. In some new video coding standards, the concept "block" is further extended. For example, a macroblock (MB) is introduced in the H.264 standard. The macroblock may be further partitioned (partition) into a plurality of prediction blocks that can be used for predictive coding. In the high efficiency video coding (HEVC) standard, basic concepts such as "coding unit" (CU), "prediction unit" (PU), and "transform unit" (TU) are used. A plurality of block units are obtained through functional division, and are described by using a new tree-based structure. For example, a CU may be split into smaller CUs through quad-tree split, and a smaller CU may be further split, to generate a quad-tree structure. A CU is a basic unit for splitting and encoding a coding image. A PU and a TU may also have similar tree structures. The PU may correspond to a prediction block, and is a basic unit for predictive coding. The CU is further partitioned into a plurality of PUs in a partitioning pattern. The TU may correspond to a transform block, and is a basic unit for transforming a prediction residual. However, all of the CU, the PU, and the TU are concepts of blocks (or picture blocks) in essence.

For example, in HEVC, a CTU is partitioned into a plurality of CUs by using a quad-tree structure represented as a coding tree. A decision on whether to encode a picture area by using inter-picture (temporal) or intra-picture (spatial) prediction is made at a CU level. Each CU may be further partitioned into one, two, or four PUs in a PU partitioning pattern. In one PU, a same prediction process is applied, and related information is transmitted to a decoder on a PU basis. After obtaining a residual block by applying the prediction process based on the PU partitioning pattern, the CU may be partitioned into transform units (TUs) based on another quad-tree structure similar to the coding tree used for the CU. In the latest development of video compression technologies, a quad-tree plus binary tree (QTBT) partition frame is used to split a coding block. In a QTBT block structure, the CU may be square or rectangular.

In this specification, for ease of description and understanding, a to-be-coded image block in a current coding image may be referred to as a current block. For example, in encoding, the current block is a block being encoded; and in decoding, the current block is a block being decoded. A decoded picture block, in a reference picture, used to predict the current block is referred to as a reference block. To be specific, the reference block is a block that provides a reference signal for the current block, and the reference signal represents pixel values in the picture block. A block that provides a prediction signal for the current block and that is in the reference image may be referred to as a prediction block. The prediction signal represents pixel values, sample values, or a sample signal in the prediction block. For example, an optimal reference block is found after a plurality of reference blocks are traversed. The optimal reference block provides prediction for the current block, and this block is referred to as a prediction block.

In a case of lossless video coding, original video pictures can be reconstructed. This means that reconstructed video pictures have same quality as the original video pictures (assuming that no transmission loss or other data loss occurs during storage or transmission). In a case of lossy video coding, further compression is performed through, for example, quantization, to reduce an amount of data required for representing video pictures, and the video pictures cannot be completely reconstructed on a decoder side. This means that quality of reconstructed video pictures is lower or poorer than that of the original video pictures.

Several H.261 video coding standards are used for "lossy hybrid video codecs" (namely, spatial and temporal prediction in a sample domain is combined with 2D transform coding for applying quantization in a transform domain). Each picture of a video sequence is typically partitioned into a set of non-overlapping blocks, and coding is typically performed at a block level. In other words, on an encoder side, a video is typically processed, that is, encoded, at a block (video block) level. For example, a prediction block is generated through spatial (intra-picture) prediction and temporal (inter-picture) prediction, the prediction block is subtracted from a current block (a block that is being processed or to be processed) to obtain a residual block, and the residual block is transformed in the transform domain and quantized to reduce an amount of data that is to be transmitted (compressed). On the decoder side, an inverse processing part relative to the encoder is applied to the encoded or compressed block to reconstruct the current block for representation. Furthermore, the encoder duplicates a processing loop of the decoder, so that the encoder and the decoder generate identical prediction (for example, intra prediction and inter prediction) and/or reconstruction for processing, that is, coding, subsequent blocks.

The following describes a system architecture to which the embodiments of the disclosure are applied. FIG. 1A is a schematic block diagram of an example video coding system 10 to which an embodiment of the disclosure is applied. As shown in FIG. 1A, the video coding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a "smartphone", a television, a camera, a display apparatus, a digital media player, a video game console, an in-vehicle computer, a wireless communications device, and the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software or by using separate hardware and/or software or any combination thereof.

A communication connection between the source device 12 and the destination device 14 may be implemented over a link 13, and the destination device 14 may receive encoded video data from the source device 12 over the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communication standard (for example, a wireless communication protocol), and may transmit modulated video data to the destination device 14. The one or more communications media may include a wireless communications medium and/or a wired communications medium, for example, a radio frequency (RF) spectrum or one or more physical transmission lines. The one or more communications media may constitute a part of a packet-based network, and the packet-based network is, for example, a local area network, a wide area network, or a global network (for example, the Internet). The one or more communications media may include a router, a switch, a base station, or another device that facilitates communication from the source device 12 to the destination device 14.

The source device 12 includes an encoder 20, and in an embodiment, the source device 12 may further include a picture source 16, a picture pre-processor 18, and a communications interface 22. In a specific implementation form, the encoder 20, the picture source 16, the picture pre-processor 18, and the communications interface 22 may be hardware components in the source device 12, or may be a software program in the source device 12. Separate descriptions are provided in the following.

The picture source 16 may include or be any type of picture capture device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture); and/or any combination thereof (for example, an augmented reality (AR) picture). The picture source 16 may be a camera for capturing a picture or a memory for storing a picture. The picture source 16 may further include any type of (internal or external) interface through which a previously captured or generated picture is stored and/or a picture is obtained or received. When the picture source 16 is a camera, the picture source 16 may be, for example, a local camera or a camera integrated into the source device. When the picture source 16 is a memory, the picture source 16 may be, for example, a local memory or a memory integrated into the source device. When the picture source 16 includes an interface, the interface may be, for example, an external interface for receiving a picture from an external video source. The external video source is, for example, an external picture capture device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements (picture elements). The picture element in the array may also be referred to as a sample. A quantity of samples in horizontal and vertical directions (or axes) of the array or the picture defines a size and/or a resolution of the picture. For representation of a color, typically three color components are employed. For example, the picture may be represented as or include three sample arrays. For example, in an RGB format or a color space, a picture includes corresponding red, green, and blue sample arrays. However, in video coding, each pixel is typically represented in a luminance/chrominance format or a color space. For example, a picture in a YUV format includes a luminance component indicated by Y (sometimes L is used instead) and two chrominance components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luma sample array of luma sample values (Y) and two chroma sample arrays of chroma values (U and V). A picture in an RGB format may be converted or transformed into a picture in the YUV format and vice versa, and such a process is also known as color transformation or conversion. If a picture is monochrome, the picture may include only a luma sample array. In this embodiment of the disclosure, a picture transmitted by the picture source 16 to a picture processor may also be referred to as original picture data 17.

The picture pre-processor 18 is configured to receive the original picture data 17 and pre-process the original picture data 17, to obtain a pre-processed picture 19 or pre-processed picture data 19. For example, the pre-processing performed by the picture pre-processor 18 may include trimming, color format conversion (for example, from an RGB format to a YUV format), color correction, or denoising.

The encoder 20 (also referred to as a video encoder 20) is configured to receive the pre-processed picture data 19, and process the pre-processed picture data 19 by using a related prediction mode (such as a prediction mode in each embodiment of this specification), to provide encoded picture data 21 (structural details of the encoder 20 are further described below based on FIG. 2, FIG. 4, or FIG. 5). In some embodiments, the encoder 20 may be configured to perform various embodiments described below, to implement encoder-side application of the chroma block prediction method described in the disclosure.

The communications interface 22 may be configured to receive the encoded picture data 21, and transmit the encoded picture data 21 to the destination device 14 or any other device (for example, a memory) over the link 13 for storage or direct reconstruction. The any other device may be any device used for decoding or storage. The communications interface 22 may be, for example, configured to package the encoded picture data 21 into an appropriate format, for example, a data packet, for transmission over the link 13.

The destination device 14 includes a decoder 30, and in an embodiment, the destination device 14 may further include a communications interface 28, a picture post-processor 32, and a display device 34. Separate descriptions are provided in the following.

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 over the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communications interface 28 may be, for example, configured to depackage the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to establish a connection, and acknowledge and exchange any other information related to a communication link and/or data transmission such as encoded picture data transmission.

The decoder 30 (also referred to as the video decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform various embodiments described below, to implement decoder-side application of the chroma block prediction method described in the present disclosure.

The picture post-processor 32 is configured to post-process the decoded picture data 31 (also referred to as reconstructed picture data), to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or include any type of display configured to present a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other displays.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software or by using separate hardware and/or software or any combination thereof.

A person skilled in the art may be learned that based on the descriptions, existence and (exact) split of functionalities of the different units or functionalities of the source device 12 and/or the destination device 14 shown in FIG. 1A may vary depending on an actual device and application. The source device 12 and the destination device 14 each may be any one of a wide range of devices, including any type of handheld or stationary device, for example, a notebook or laptop computer, a mobile phone, a smartphone, a pad or a tablet computer, a video camera, a desktop computer, a set-top box, a television, a camera, a vehicle-mounted device, a display device, a digital media player, a video game console, a video streaming device (such as a content service server or a content distribution server), a broadcast receiver device, or a broadcast transmitter device, and may not use or may use any type of operating system.

The encoder 20 and the decoder 30 each may be implemented as any one of various appropriate circuits, for example, one or more microprocessors, digital signal processors (DSPs), application-specific integrated circuits (ASICs), field-programmable gate arrays (FPGAs), discrete logic, hardware, or any combinations thereof. If the technologies are implemented partially by using software, a device may store software instructions in an appropriate non-transitory computer-readable storage medium and may execute the instructions by using hardware such as one or more processors, to perform the technologies of this disclosure. Any one of the foregoing content (including hardware, software, a combination of hardware and software, and the like) may be considered as one or more processors.

In some cases, the video coding system 10 shown in FIG. 1A is merely an example and the techniques of this application may be applied to video coding settings (for example, video encoding or video decoding) that do not necessarily include any data communication between an encoding device and a decoding device. In other examples, data may be retrieved from a local memory, streamed over a network, or the like. A video encoding device may encode and store data in the memory, and/or a video decoding device may retrieve and decode data from the memory. In some examples, the encoding and decoding processes are performed by devices that do not communicate with one another, but simply encode data to the memory and/or retrieve and decode data from the memory.

Figure 1B:
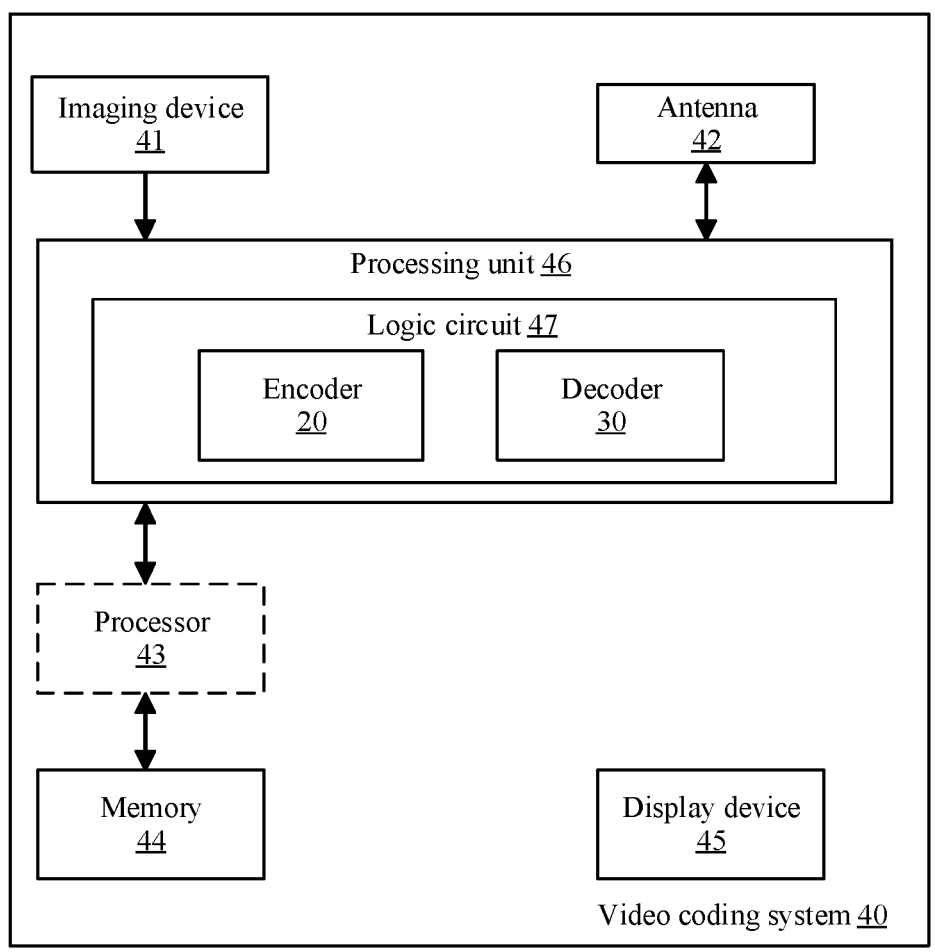
FIG. 1B is a block diagram of an example video coding system 40 for implementing an embodiment of the disclosure.
Figure 2:
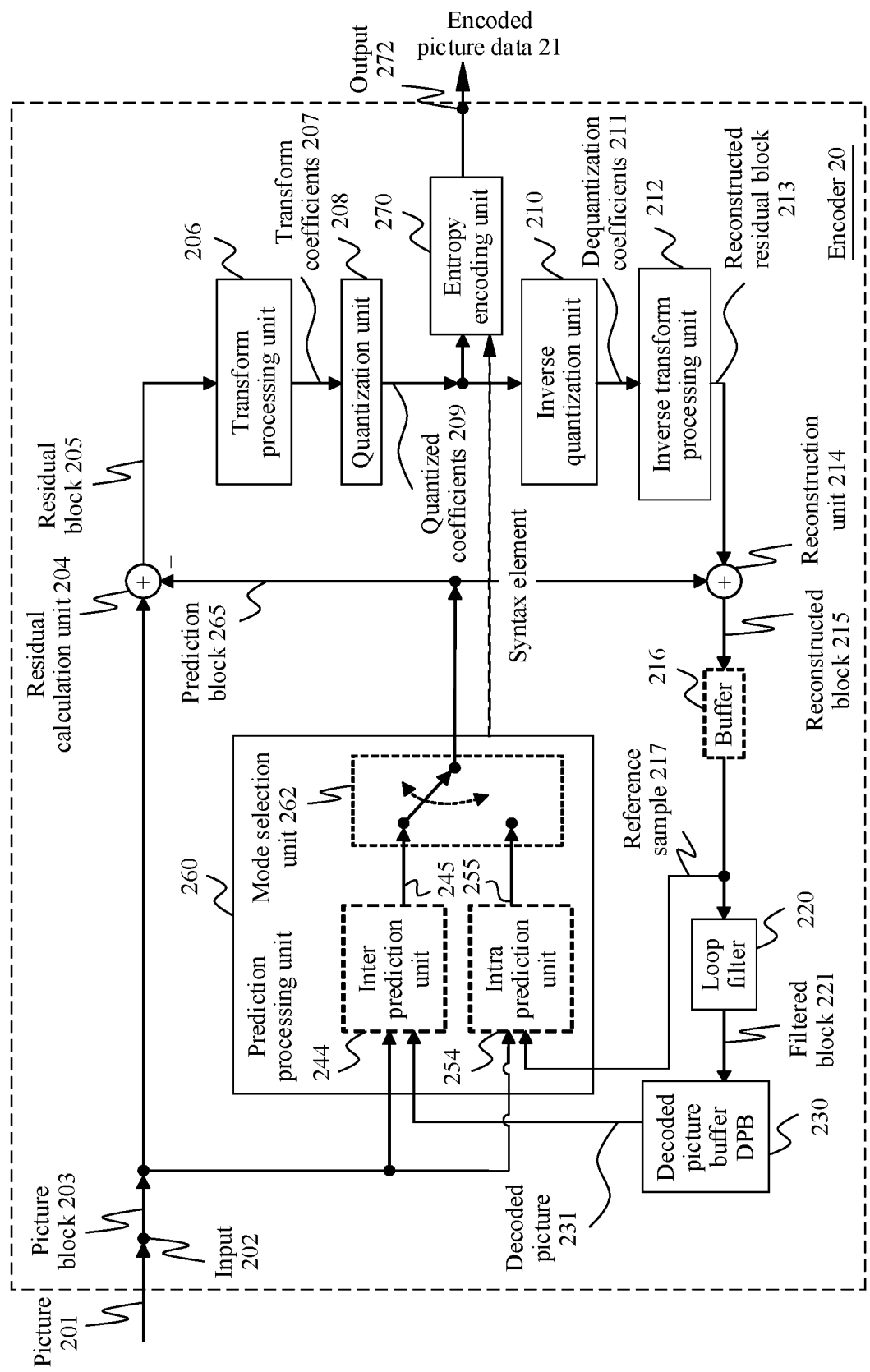
FIG. 2 is a block diagram of an example structure of an encoder 20 for implementing an embodiment of the disclosure.
Figure 3:
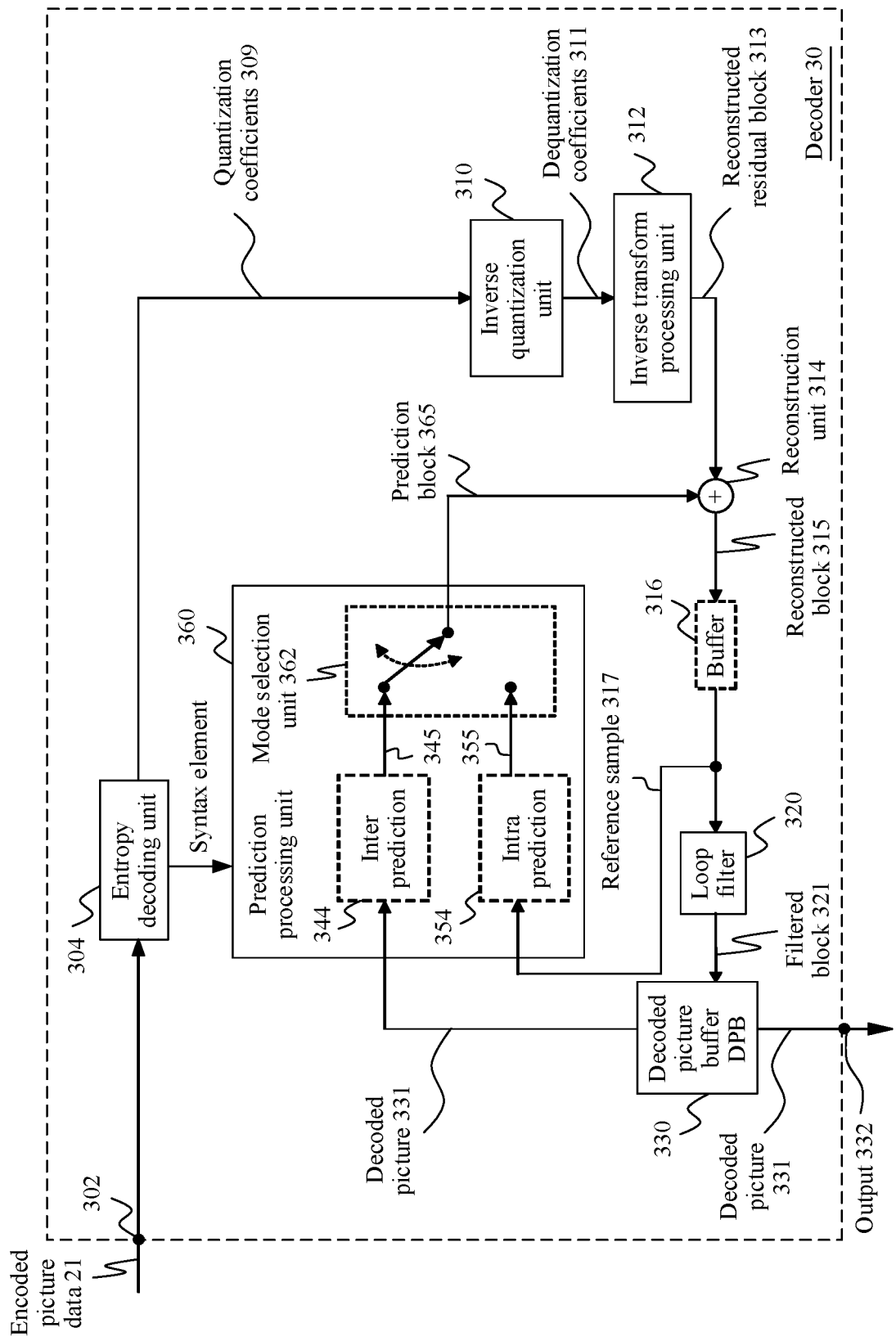
FIG. 3 is a block diagram of an example structure of a decoder 30 for implementing an embodiment of the disclosure.

FIG. 1B is an illustrative diagram of an example video coding system 40, including the encoder 20 in FIG. 2 and/or the decoder 30 in FIG. 3, according to an example embodiment. The video coding system 40 can implement a combination of various techniques in the embodiments of the disclosure. In the illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include an application-specific integrated circuit (ASIC) logic, a graphics processor, a general-purpose processor, or the like. The video coding system 40 may also include the optional processor 43. The optional processor 43 may similarly include an application-specific integrated circuit (ASIC) logic, a graphics processor, a general-purpose processor, or the like. In some examples, the logic circuit 47 may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (SRAM), a dynamic random access memory (DRAM)), or a nonvolatile memory (for example, a flash memory). In a non-restrictive example, the memory 44 may be implemented by a cache memory. In some examples, the logic circuit 47 may access the memory 44 (for example, for implementing a picture buffer). In other examples, the logic circuit 47 and/or the processing unit 46 may include a memory (for example, a cache) for implementing a picture buffer or the like.

In some examples, the encoder 20 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the encoder 20 implemented by using the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by using the logic circuit 47 in a similar manner, to implement various modules that are described with reference to the decoder 30 in FIG. 3 and/or any other decoder system or subsystem described in this specification. In some examples, the decoder 30 implemented by using the logic circuit may include a picture buffer (which is implemented by, for example, a processing unit 2820 or the memory 44) and a graphics processing unit (which is implemented by, for example, the processing unit 46). The graphics processing unit may be communicatively coupled to the picture buffer. The graphics processing unit may include the decoder 30 implemented by using the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like related to video frame coding described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of the disclosure, for the example described with reference to the encoder 20, the decoder 30 may be configured to perform an inverse process. With regard to a signaling syntax element, the decoder 30 may be configured to receive and parse such a syntax element and correspondingly decode related video data. In some examples, the encoder 20 may entropy encode the syntax element into an encoded video bitstream. In such examples, the decoder 30 may parse such a syntax element and correspondingly decode related video data.

It should be noted that a method for constructing a merge candidate motion information list described in the embodiments of the disclosure is mainly applied in an inter prediction process, and the process exists on both the encoder 20 and the decoder 30. The encoder 20/the decoder 30 in the embodiments of the disclosure may be an encoder/decoder corresponding to a video standard protocol such as H.263, H.264, HEVV, MPEG-2, MPEG-4, VP8, or VP9, or corresponding to a next-generation video standard protocol (for example, H.266).

FIG. 2 is a schematic/conceptual block diagram of an example encoder 20 configured to implement an embodiment of the disclosure. In the example of FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a reverse signal path of the encoder. The reverse signal path of the encoder corresponds to a signal path of a decoder (refer to the decoder 30 in FIG. 3).

The encoder 20 receives, for example, from an input 202, a picture 201 or an image block 203 of the picture 201, for example, a picture in a sequence of pictures forming a video or a video sequence. The image block 203 may also be referred to as a current picture block or a to-be-encoded picture block. The picture 201 may be referred to as a current picture or a to-be-encoded picture (particularly in video coding, to distinguish the current picture from other pictures, the other pictures are, for example, previously encoded and/or decoded pictures in a same video sequence, that is, the video sequence that also includes the current picture).

In an embodiment, the encoder 20 may include a partitioning unit (not depicted in FIG. 2), configured to partition the picture 201 into a plurality of blocks such as the picture blocks 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning techniques described above.

Like the picture 201, the image block 203 is also or may be considered as a two-dimensional array or matrix of samples with sample values, although of a smaller size than the picture 201. In other words, the image block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the image block 203 defines a size of the image block 203.

The encoder 20 shown in FIG. 2 is configured to encode the picture 201 block by block. For example, the encoder 20 encodes and predicts each image block 203.

The residual calculation unit 204 is configured to calculate a residual block 205 based on the image block 203 and a prediction block 265 (further details about the prediction block 265 are provided below), for example, obtain the residual block 205 in a sample domain by subtracting sample values of the prediction block 265 from sample values of the image block 203 sample by sample (pixel by pixel).

The transform processing unit 206 is configured to apply a transform, for example, a discrete cosine transform (DCT) or a discrete sine transform (DST), on sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply an integer approximation of DCT/DST, such as transforms specified in HEVC/H.265. In comparison with an orthogonal DCT transform, such an integer approximation is typically scaled by a factor. To preserve a norm of a residual block that is processed by using forward and inverse transforms, applying an additional scale factor is a part of a transform process. The scale factor is usually chosen based on some constraints. For example, the scale factor is a power of two for a shift operation, a bit depth of the transform coefficient, or a tradeoff between accuracy and implementation costs. Specific scale factors are specified for the inverse transform, for example, by the inverse transform processing unit 212 on the decoder side 30 (and the corresponding inverse transform, for example, by the inverse transform processing unit 212 on the encoder side 20), and correspondingly, a corresponding scale factor may be specified for the forward transform, for example, by the transform processing unit 206 on the encoder side 20.

The quantization unit 208 is configured to quantize the transform coefficients 207 to obtain quantized transform coefficients 209, for example, by applying scalar quantization or vector quantization. The quantized transform coefficients 209 may also be referred to as quantized residual coefficients 209. The quantization process may reduce a bit depth associated with some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization operation corresponds to finer quantization, and a larger quantization operation corresponds to coarser quantization. An applicable quantization operation may be indicated by the quantization parameter (QP). The quantization parameter may be, for example, an index of a predefined set of applicable quantization operations. For example, a smaller quantization parameter may correspond to finer quantization (a smaller quantization operation) and a larger quantization parameter may correspond to coarser quantization (a larger quantization operation) or vice versa. The quantization may include division by a quantization operation and corresponding quantization and/or inverse quantization, for example, performed by the inverse quantization unit 210, or may include multiplication by a quantization operation. In embodiments according to some standards such as HEVC, a quantization parameter may be used to determine the quantization operation. Generally, the quantization operation may be calculated based on a quantization parameter using a fixed point approximation of an equation including division. An additional scale factor may be introduced for quantization and dequantization to restore the norm of the residual block, where the norm of the residual block may be modified because of a scale used in the fixed point approximation of the equation for the quantization operation and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where a loss increases with an increasing quantization operation.

The inverse quantization unit 210 is configured to apply inverse quantization of the quantization unit 208 to quantization coefficients to obtain dequantization coefficients 211, for example, apply, based on or by using a same quantization operation as the quantization unit 208, the inverse of a quantization scheme applied by the quantization unit 208. The dequantization coefficients 211 may also be referred to as dequantized residual coefficients 211 and correspond, although typically not identical to the transform coefficients due to the loss by quantization, to the transform coefficients 207.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (namely, a reconstructed residual block 213) to the prediction block 265 to obtain a reconstructed block 215 in a sample domain, for example, by adding a sample value of the reconstructed residual block 213 and the sample value of the prediction block 265.

Optionally, a buffer unit 216 ("buffer" 216 for short) of, for example, a line buffer 216, is configured to buffer or store the reconstructed block 215 and a corresponding sample value, for example, for intra prediction. In other embodiments, the encoder may be configured to use an unfiltered reconstructed block and/or a corresponding sample value stored in the buffer unit 216, for any type of estimation and/or prediction, for example, intra prediction.

For example, in an embodiment, the encoder 20 may be configured so that the buffer unit 216 is not only used for storing the reconstructed block 215 for the intra prediction unit 254 but also used for the loop filter unit 220 (not depicted in FIG. 2), and/or so that, for example, the buffer unit 216 and the decoded picture buffer unit 230 form one buffer. In other embodiments, a filtered block 221 and/or a block or a sample from the decoded picture buffer 230 (the block or sample is not depicted in FIG. 2) are/is used as an input or a basis for the intra prediction unit 254.

The loop filter unit 220 (briefly referred to as a "loop filter" 220) is configured to filter the reconstructed block 215 to obtain the filtered block 221, to smooth pixel transition or improve video quality. The loop filter unit 220 is intended to represent one or more loop filters such as a deblocking filter, a sample-adaptive offset (SAO) filter, or another filter such as a bilateral filter, an adaptive loop filter (ALF), a sharpening or smoothing filter, or a collaborative filter. Although the loop filter unit 220 is shown in FIG. 2 as an in-loop filter, in other configurations, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (such as sample adaptive offset information), for example, directly or after entropy encoding performed by the entropy encoding unit 270 or any other entropy encoding unit, so that, for example, the decoder 30 can receive the same loop filter parameter and apply the same loop filter parameter to decoding.

The decoded picture buffer (DPB) 230 may be a reference picture memory that stores reference picture data for use in encoding video data by the encoder 20. The DPB 230 may be formed by any one of a variety of memory devices, such as a dynamic random access memory (DRAM) (including a synchronous DRAM (SDRAM), a magnetoresistive RAM (MRAM), and a resistive RAM (RRAM)), or another type of memory devices. The DPB 230 and the buffer 216 may be provided by a same memory device or separate memory devices. In an example, the decoded picture buffer (DPB) 230 is configured to store the filtered block 221. The decoded picture buffer 230 may be further configured to store another previously filtered block, for example, the previously reconstructed and filtered block 221, of a same current picture or of different pictures, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the image block 203 (a current image block 203 of the current picture 201) and reconstructed picture data, for example, reference samples of a same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra prediction mode or an inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260). The prediction mode provides an optimal match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate distortion optimization (rate distortion optimization, RDO), that is, select a prediction mode that provides minimum rate distortion optimization or select a prediction mode for which related rate distortion at least satisfies a prediction mode selection criterion.

In the following, prediction processing (for example, performed by the prediction processing unit 260) and mode selection performed (for example, performed by the mode selection unit 262) performed by the example encoder 20 are described in detail.

As described above, the encoder 20 is configured to determine or select the optimal or optimum prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In an embodiment, a set of inter prediction modes depends on available reference pictures (namely, for example, at least some decoded pictures stored in the DPB 230 as described above) and other inter prediction parameters, for example, depends on whether an entire reference picture or only a part of the reference picture, for example, a search window region around a region of a current block, is used for searching for an optimal matched reference block, and/or for example, depends on whether pixel interpolation such as half-pixel and/or quarter-pixel interpolation is applied. The set of inter prediction modes may include, for example, an advanced motion vector prediction (AMVP) mode and a merge mode. During specific implementation, the set of inter prediction modes may include a refined control point-based AMVP mode and a refined control point-based merge mode in the embodiments of the disclosure. In an example, the intra prediction unit 254 may be configured to perform any combination of inter prediction techniques described below.

In addition to the foregoing prediction modes, a skip mode and/or a direct mode may also be applied in the embodiments of the disclosure.

The prediction processing unit 260 may be further configured to partition the image block 203 into smaller block partitions or sub-blocks, for example, by iteratively using quad-tree (QT) partitioning, binary-tree (BT) partitioning, triple-tree (TT) partitioning, or any combination thereof, and to perform, for example, prediction on each of the block partitions or sub-blocks, where mode selection includes selection of a tree structure of the partitioned image block 203 and selection of a prediction mode applied to each of the block partitions or sub-blocks.

The inter prediction unit 244 may include a motion estimation (ME) unit (not depicted in FIG. 2) and a motion compensation (MC) unit (not depicted in FIG. 2). The motion estimation unit is configured to receive or obtain the image block 203 (the current image block 203 of the current picture 201) and the decoded pictures 231, or at least one or more previously reconstructed blocks, for example, one or more reconstructed blocks of one or more other/different previously decoded pictures 231, for motion estimation. For example, a video sequence may include the current picture and a previously decoded picture 31. In other words, the current picture and the previously decoded picture 31 may be a part of a sequence of pictures forming a video sequence or form the sequence of pictures.

For example, the encoder 20 may be configured to select a reference block from a plurality of reference blocks of a same picture or different pictures of a plurality of other pictures and provide, for a motion estimation unit (not depicted in FIG. 2), a reference picture and/or provide an offset (a spatial offset) between a location (coordinates X and Y) of the reference block and a location of the current block as an inter prediction parameter. This offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not depicted in FIG. 2) may include extracting or generating a prediction block based on a motion/block vector determined through motion estimation (interpolation may be performed at a sub-pixel precision level). Interpolation filtering may generate additional pixel samples from known pixel samples, thereby potentially increasing a quantity of candidate prediction blocks that may be used to code a picture block. Upon receiving a motion vector for a PU of the current picture block, the motion compensation unit 246 may locate a prediction block to which the motion vector points in one of reference picture lists. The motion compensation unit 246 may further generate a syntax element associated with a block and a video slice, for use by the decoder 30 in decoding a picture block of the video slice.

The inter prediction unit 244 may transmit a syntax element to the entropy encoding unit 270, where the syntax element includes an inter prediction parameter (for example, indication information of an inter prediction mode that is selected for prediction of the current block after a plurality of inter prediction modes are traversed). In a possible application scenario, if there is only one inter prediction mode, the inter prediction parameter may alternatively not be carried in the syntax element. In this case, the decoder side 30 may directly perform decoding in a default prediction mode. It can be understood that the inter prediction unit 244 may be configured to perform any combination of inter prediction techniques.

The intra prediction unit 254 is configured to obtain, for example, receive, an image block 203 (the current picture block) and one or more previously reconstructed blocks, for example, reconstructed neighboring blocks, of a same picture for intra estimation. The encoder 20 may be, for example, configured to select an intra prediction mode from a plurality of (predetermined) intra prediction modes.

In an embodiment, the encoder 20 may be configured to select an intra prediction mode according to an optimization criterion, for example, based on a minimum residual (for example, an intra prediction mode providing the prediction block 255 that is most similar to the current image block 203) or minimum rate distortion.

The intra prediction unit 254 is further configured to determine the intra prediction block 255 based on, for example, an intra prediction parameter of the selected intra prediction mode. In any case, after selecting the intra prediction mode for a block, the intra prediction unit 254 is further configured to provide the intra prediction parameter, namely, information indicating the selected intra prediction mode for the block, for the entropy encoding unit 270. In an example, the intra prediction unit 254 may be configured to perform any combination of intra prediction techniques.

The intra prediction unit 254 may transmit a syntax element to the entropy encoding unit 270, where the syntax element includes an intra prediction parameter (for example, indication information of an intra prediction mode that is selected for prediction of the current block after a plurality of intra prediction modes are traversed). In a possible application scenario, if there is only one intra prediction mode, the intra prediction parameter may alternatively not be carried in the syntax element. In this case, the decoder side 30 may directly perform decoding in a default prediction mode.

The entropy encoding unit 270 is configured to apply (or bypass) an entropy encoding algorithm or a scheme (for example, a variable length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy coding method or technique) on one or all of the following: the quantization coefficients 209, the inter prediction parameter, the intra prediction parameter, and/or the loop filter parameter, to obtain the encoded picture data 21 that can be output through an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode another syntax element for a current video slice being encoded.

Other structural variations of the video encoder 20 may be configured to encode a video stream. For example, a non-transform based encoder 20 may quantize a residual signal directly without the transform processing unit 206 for some blocks or frames. In another implementation, the encoder 20 includes the quantization unit 208 and the inverse quantization unit 210 that can be combined into a single unit.

In this embodiment of the disclosure, the encoder 20 can be configured to implement the method for constructing a merge candidate motion information list described in the following embodiments.

It should be understood that other structural variations of the video encoder 20 may be configured to encode a video stream. For example, for some picture blocks or picture frames, the video encoder 20 may quantize the residual signal directly without processing performed by the transform processing unit 206, and correspondingly, without processing performed by the inverse transform processing unit 212. Alternatively, for some picture blocks or picture frames, the video encoder 20 does not generate residual data, and correspondingly, there is no need for the transform processing unit 206, the quantization unit 208, the inverse quantization unit 210, and the inverse transform processing unit 212 to perform processing. Alternatively, the video encoder 20 may directly store a reconstructed picture block as a reference block, without processing performed by the filter 220. Alternatively, the quantization unit 208 and the inverse quantization unit 210 in the video encoder 20 may be combined together. The loop filter 220 is optional. In a case of lossless compression encoding, the transform processing unit 206, the quantization unit 208, the inverse quantization unit 210, and the inverse transform processing unit 212 are optional. It should be understood that the inter prediction unit 244 and the intra prediction unit 254 may be used selectively in different application scenarios.

FIG. 3 is a schematic/conceptual block diagram of an example decoder 30 configured to implement an embodiment of the disclosure. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and associated syntax elements.

In the example of FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding process that is roughly inverse to the encoding process described with reference to the video encoder 20 in FIG. 2.

The entropy decoding unit 304 is configured to entropy decode the encoded picture data 21 to obtain, for example, quantization coefficients 309 and/or decoded encoding parameters (not depicted in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in functions, and the intra prediction unit 354 may resemble the intra prediction unit 254 in functions. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is coded as an intra-coded (I) slice, the intra prediction unit 354 of the prediction processing unit 360 is configured to generate a prediction block 365 for a picture block of the current video slice based on a signaled intra prediction mode and data that is from a previously decoded block of a current frame or picture. When a video frame is coded as an inter-coded (B or P) slice, the inter prediction unit 344 (for example, a motion compensation unit) of the prediction processing unit 360 is configured to generate a prediction block 365 for a video block of the current video slice based on a motion vector and another syntax element that is received from the entropy decoding unit 304. For inter prediction, the prediction block may be generated from one of reference pictures in one reference picture list. The video decoder 30 may construct reference frame lists: a list 0 and a list 1, by using a default construction technique based on reference pictures stored in the DPB 330.

The prediction processing unit 360 is configured to determine prediction information for the video block of the current video slice by parsing the motion vector and the another syntax element, and use the prediction information to generate a prediction block for the current video block being decoded. In an example of the disclosure, the prediction processing unit 360 determines, by using some received syntax elements, a prediction mode (for example, intra prediction or inter prediction) for encoding the video block in the video slice, an inter prediction slice type (for example, a B slice, a P slice, or a GPB slice), construction information of one or more of the reference picture lists for the slice, a motion vector of each inter encoded video block for the slice, an inter prediction status of each inter encoded video block in the slice, and other information, to decode the video block in the current video slice. In another example of this disclosure, the syntax elements received by the video decoder 30 from a bitstream include syntax elements in one or more of an adaptive parameter set (APS), a sequence parameter set (SPS), a picture parameter set (PPS), or a slice header.

The inverse quantization unit 310 may be configured to inverse quantize (namely, dequantize) a quantized transform coefficient provided in the bitstream and decoded by the entropy decoding unit 304. An inverse quantization process may include: using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to the transform coefficient to generate a residual block in a pixel domain.

The reconstruction unit 314 (for example, the summer 314) is configured to add an inverse transform block 313 (namely, a reconstructed residual block 313) to the prediction block 365 to obtain a reconstructed block 315 in a sample domain, for example, by adding a sample value of the reconstructed residual block 313 and a sample value of the prediction block 365.

The loop filter unit 320 (during a coding loop or after a coding loop) is configured to filter the reconstructed block 315 to obtain a filtered block 321, to smooth pixel transition or improve video quality. In an example, the loop filter unit 320 may be configured to perform any combination of filtering techniques described below. The loop filter unit 320 is intended to represent one or more loop filters such as a deblocking filter, a sample-adaptive offset (SAO) filter, or another filter such as a bilateral filter, an adaptive loop filter (ALF), a sharpening or smoothing filter, or a collaborative filter. Although the loop filter unit 320 is shown in FIG. 3 as an in-loop filter, in other configurations, the loop filter unit 320 may be implemented as a post-loop filter.

The decoded video block 321 in a given frame or picture is then stored in the decoded picture buffer 330 that stores a reference picture used for subsequent motion compensation.

The decoder 30 is configured to, for example, output the decoded picture 31 through an output 332, for presentation to a user or viewing by a user.

Other variations of the video decoder 30 may be configured to decode a compressed bitstream. For example, the decoder 30 may generate an output video stream without the loop filter unit 320. For example, a non-transform based decoder 30 may inversely quantize a residual signal directly without the inverse transform processing unit 312 for some blocks or frames. In another implementation, the video decoder 30 includes the inverse quantization unit 310 and the inverse transform processing unit 312 that can be combined into a single unit.

In this embodiment of the disclosure, the decoder 30 is configured to implement the method for constructing a merge candidate motion information list described in the following embodiments.

It should be understood that other structural variations of the video decoder 30 may be configured to decode the encoded video bitstream. For example, the video decoder 30 may generate an output video stream without processing performed by the filter 320. Alternatively, for some picture blocks or picture frames, the entropy decoding unit 304 of the video decoder 30 does not obtain quantization coefficients through decoding, and correspondingly, there is no need for the inverse quantization unit 310 and the inverse transform processing unit 312 to perform processing. The loop filter 320 is optional. In a case of lossless compression, the inverse quantization unit 310 and the inverse transform processing unit 312 are optional. It should be understood that the inter prediction unit and the intra prediction unit may be used selectively in different application scenarios.

It should be understood that on the encoder 20 and the decoder 30 in this application, a processing result for a procedure may be output to a next procedure after being further processed. For example, after a procedure such as interpolation filtering, motion vector derivation, or loop filtering, an operation such as clip or shift (shift) is further performed on a processing result of a corresponding procedure.

For example, a motion vector of a control point of the current picture block or a motion vector of a sub-block of the current picture block derived from a motion vector of a neighboring affine coded block may be further processed. This is not limited in this application. For example, a value of a motion vector is restricted to be within a specific bit width range. Assuming that an allowed bit width of a motion vector is bitDepth, a value of the motion vector ranges from $-2^{bitDepth-1}$ to $2^{bitDepth-1}-1$. If bitDepth is 16, the value ranges from −32768 to 32767. If bitDepth is 18, the value ranges from −131072 to 131071. For another example, values of motion vectors (for example, motion vectors MVs of four 4×4 sub-blocks in an 8×8 picture block) are restricted, so that a maximum difference between integer parts of the MVs of the four 4×4 sub-blocks does not exceed N pixels, for example, does not exceed one pixel.

The following two manners may be used to restrict the motion vector to be within a specific bit width:

Manner 1: An overflow most significant bit of the motion vector is removed:

$$ux = (vx + 2^{bitDepth}) \% 2^{bitDepth}$$
$$vx = (ux \geq 2^{bitDepth-1}) ? (ux - 2^{bitDepth}) : ux$$
$$uy = (vy + 2^{bitDepth}) \% 2^{bitDepth}$$
$$vy = (uy \geq 2^{bitDepth-1}) ? (uy - 2^{bitDepth}) : uy$$

vx represents a horizontal component of the motion vector of the picture block or the sub-block of the picture block. vy represents a vertical component of the motion vector of the picture block or the sub-block of the picture block. ux and uy are intermediate values. bitDepth represents a bit depth.

For example, a value of vx is −32769, and 32767 is derived according to the foregoing formulas. A value is stored in a computer in a two's complement representation, a two's complement representation of −32769 is 1,0111,1111,1111,1111 (17 bits), and processing performed by the computer for overflowing is discarding a most significant bit. Therefore, a value of vx is 0111,1111,1111,1111, that is, 32767. This value is consistent with the result derived through processing according to the formulas.

Manner 2: Clipping is performed on the motion vector, as shown in the following formulas:

$$vx = Clip3(-2^{bitDepth-1}, 2^{bitDepth-1} - 1, vx)$$
$$vy = Clip3(-2^{bitDepth-1}, 2^{bitDepth-1} - 1, vy)$$

vx represents a horizontal component of the motion vector of the picture block or the sub-block of the picture block. vy represents a vertical component of the motion vector of the picture block or the sub-block of the picture block. x, y, and z correspond to three input values of an MV clamping process clip3. Clip3 is defined to indicate clipping a value of z to a range [x, y].

$$Clip3(x, y, z) = \begin{cases} x; & z < x \\ y; & z > y \\ z; & \text{otherwise} \end{cases}$$

Figure 4:
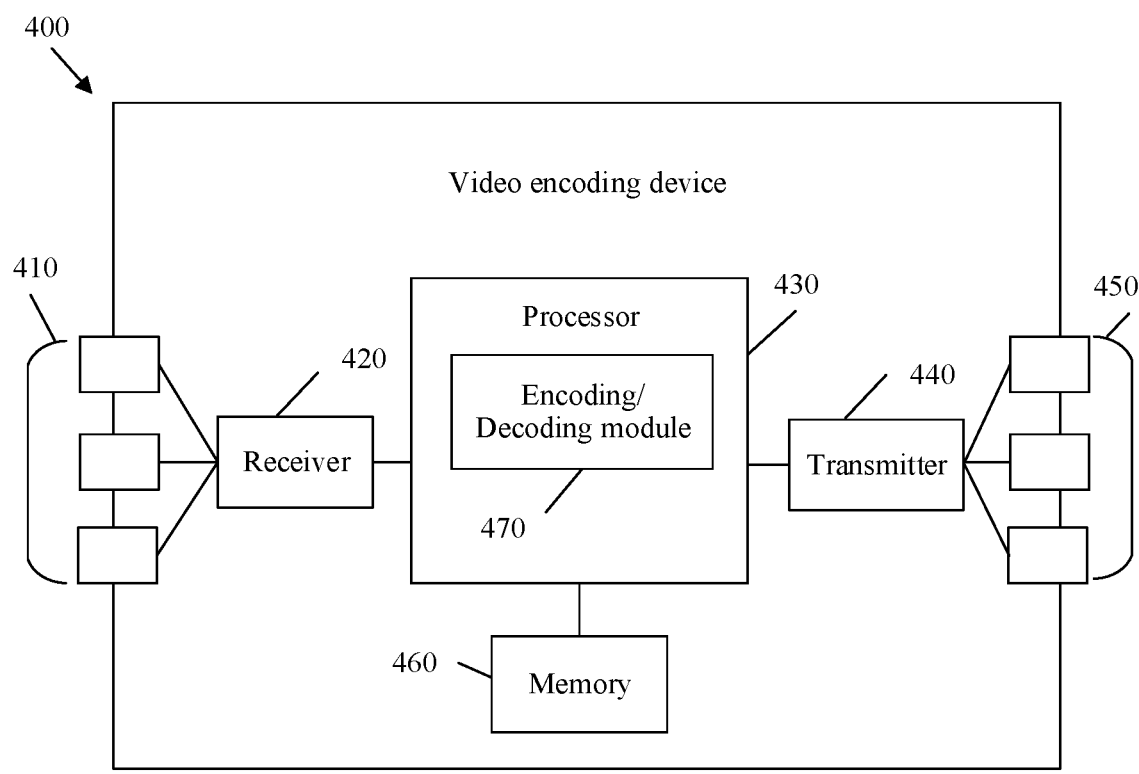
FIG. 4 is a block diagram of an example video coding device 400 for implementing an embodiment of the disclosure.

FIG. 4 is a schematic diagram depicting a structure of a video coding device 400 (for example, a video encoding device 400 or a video decoding device 400) according to an embodiment of the disclosure. The video coding device 400 is suitable for implementing an embodiment described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: ingress ports 410 and a receiver (Rx) 420 that are configured to receive data; a processor, a logic unit, or a central processing unit (CPU) 430 that is configured to process data; a transmitter (Tx) 440 and egress ports 450 that are configured to transmit data; and a memory 460 configured to store data. The video coding device 400 may further include an optical-to-electrical component and an electrical-to-optical (EO) component that are coupled to the ingress ports 410, the receiver 420, the transmitter 440, and the egress ports 450, for egress or ingress of optical signals or electrical signals.

The processor 430 is implemented by using hardware and software. The processor 430 may be implemented as one or more CPU chips, cores (for example, multi-core processors), FPGAs, ASICs, and DSPs. The processor 430 communicates with the ingress ports 410, the receiver 420, the transmitter 440, the egress ports 450, and the memory 460. The processor 430 includes a coding module 470 (for example, an encoding module 470 or a decoding module 470). The encoding/decoding module 470 implements the embodiments disclosed in this specification, to implement the chroma block prediction method provided in the embodiments of the disclosure. For example, the encoding/decoding module 470 implements, processes, or provides various coding operations. Therefore, the encoding/decoding module 470 provides a substantial improvement to functions of the video coding device 400 and affects a transform of the video coding device 400 to a different state. Alternatively, the encoding/decoding module 470 is implemented as instructions stored in the memory 460 and executed by the processor 430.

The memory 460 includes one or more disks, tape drives, and solid state drives and may be used as an overflow data storage device, to store programs when such programs are selectively executed, and to store instructions and data that are read during program execution. The memory 460 may be volatile and/or nonvolatile, and may be a read-only memory (ROM), a random access memory (RAM), a ternary content-addressable memory (TCAM), and/or a static random access memory (SRAM).

Figure 5:
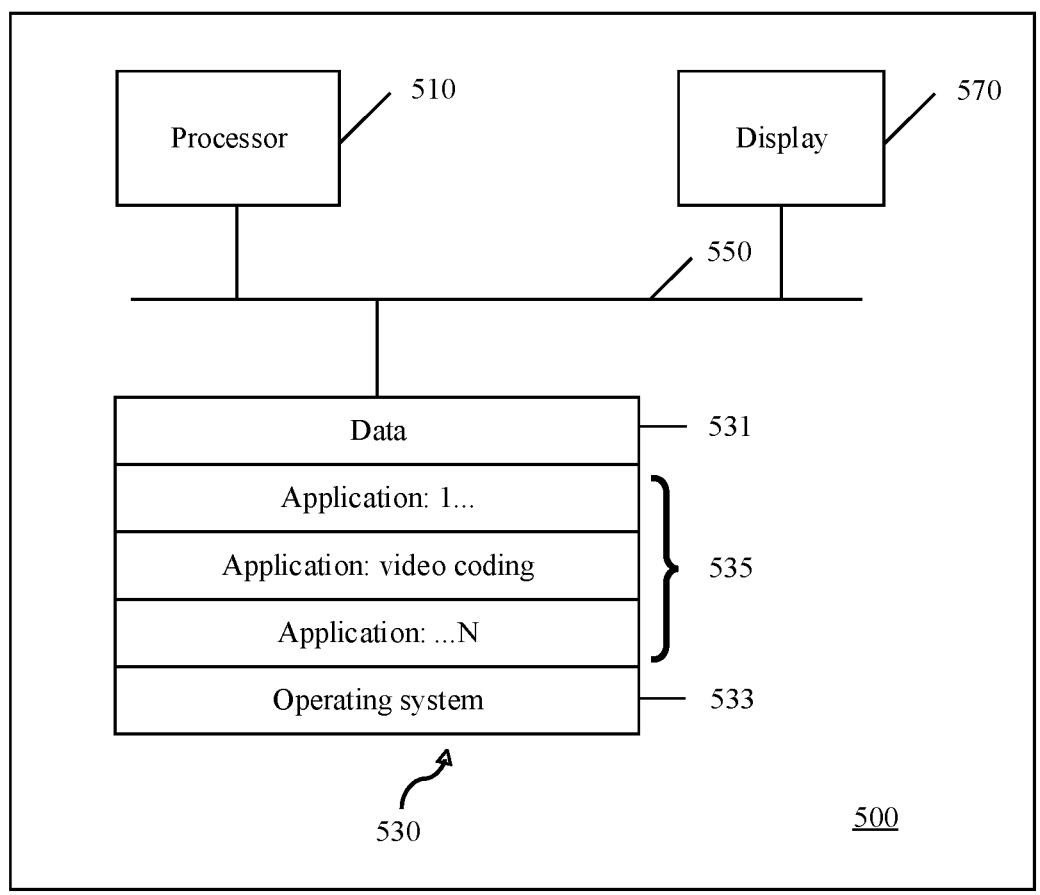
FIG. 5 is a block diagram of another example encoding apparatus or decoding apparatus for implementing an embodiment of the disclosure.

FIG. 5 is simplified block diagram of an apparatus 500 that can be used as either or both of the source device 12 and the destination device 14 in FIG. 1A according to an example embodiment. The apparatus 500 can implement the technologies of this application. In other words, FIG. 5 is a schematic block diagram of an implementation of an encoding device or a decoding device (a coding device 500 for short) according to an embodiment of this application. The coding device 500 may include a processor 510, a memory 530, and a bus system 550. The processor and the memory are connected through the bus system. The memory is configured to store instructions. The processor is configured to execute the instructions stored in the memory. The memory of the coding device stores program code. The processor can invoke the program code stored in the memory, to perform various video encoding or decoding methods described in this application. To avoid repetition, details are not described herein again.

In this embodiment of this application, the processor 510 may be a central processing unit (CPU for short), or the processor 510 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or may be any conventional processor or the like.

The memory 530 may include a read-only memory (ROM) device or a random access memory (RAM) device. Any other suitable type of storage device may alternatively be used as the memory 530. The memory 530 may include code and data 531 accessed by the processor 510 through the bus 550. The memory 530 may further include an operating system 533 and an application program 535. The application program 535 includes at least one program that allows the processor 510 to perform the video encoding or decoding method described in this application (in particular, the method for constructing a merge candidate motion information list described in this application).

The bus system 550 may not only include a data bus, but also include a power bus, a control bus, a status signal bus, and the like. However, for clear description, various types of buses in the figure are marked as the bus system 550.

Optionally, the coding device 500 may further include one or more output devices, for example, a display 570. In an example, the display 570 may be a touch-sensitive display that combines a display and a touch-sensitive unit that is operable to sense a touch input. The display 570 may be connected to the processor 510 through the bus 550.

The following describes in detail the solutions in the embodiments of this application.

Figure 6:
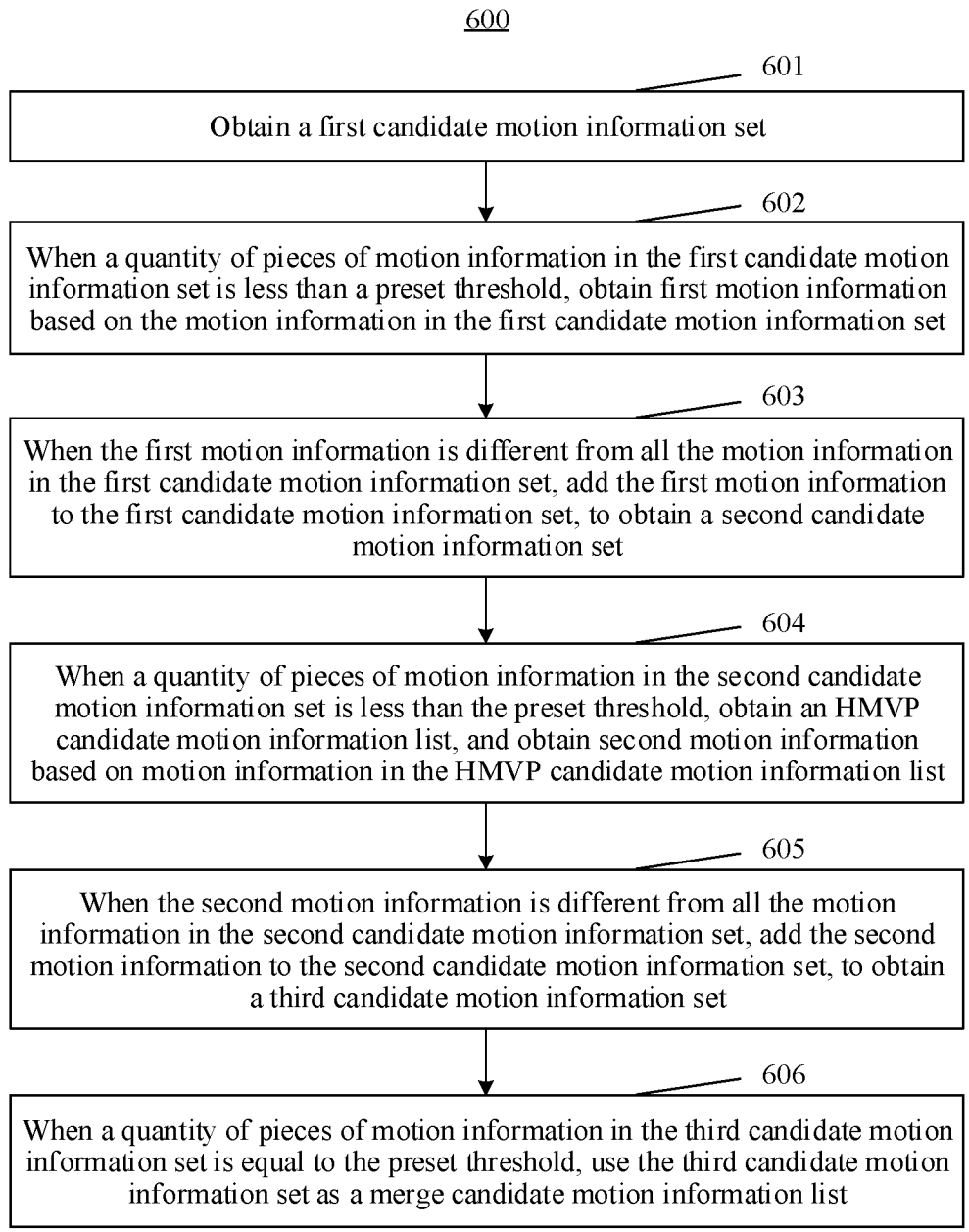
FIG. 6 is a schematic flowchart of a method for constructing a merge candidate motion information list for implementing an embodiment of this application.

FIG. 6 is a schematic flowchart of a method for constructing a merge candidate motion information list for implementing an embodiment of this application. The process 600 may be performed by the video encoder 20 or the video decoder 30. The process 600 is described as a series of operations. It should be understood that the operations of the process 600 may be performed in various sequences and/or performed simultaneously, and are not limited to an execution sequence shown in FIG. 6. As shown in FIG. 6, the method for constructing a merge candidate motion information list includes the following operations.

Operation 601: Obtain a first candidate motion information set.

The first candidate motion information set includes motion information of at most four spatially neighboring blocks of a current block, and/or motion information of at most one temporally neighboring block of the current block. The motion information includes reference frame information, a motion vector, and the like. The reference frame information may include at least one of the following: a prediction direction (for example, unidirectional/bidirectional prediction information) and a reference frame index. The motion vector is a position offset in a horizontal direction and a vertical direction.

Figure 7:
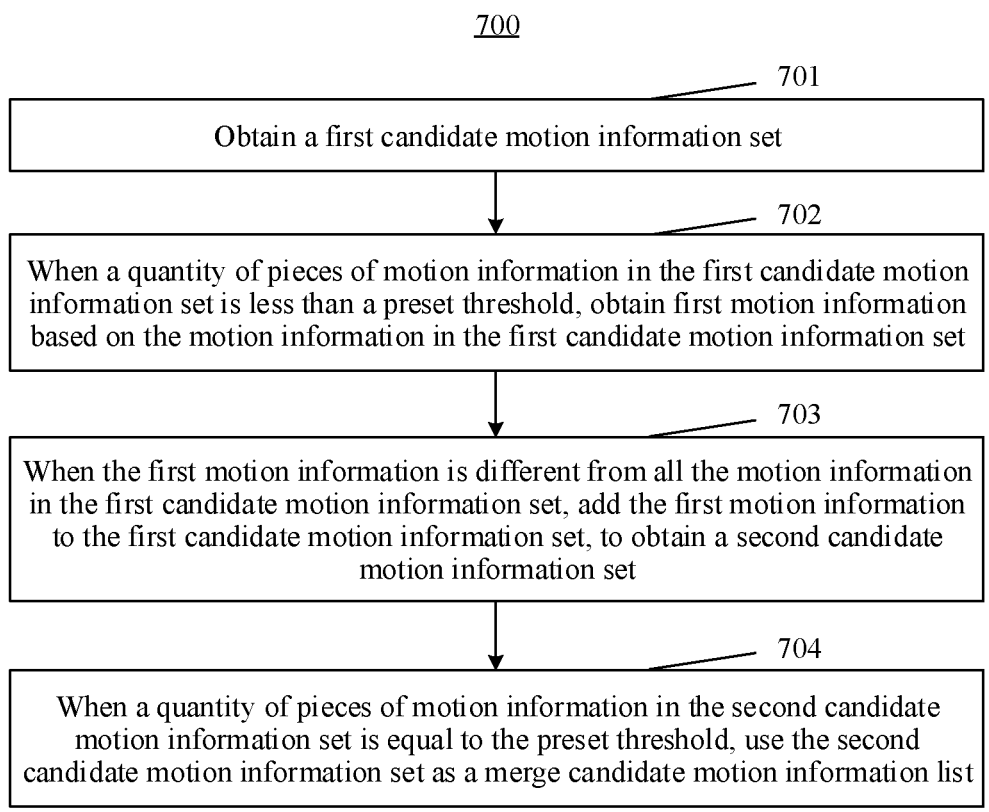
FIG. 7 is another schematic flowchart of a method for constructing a merge candidate motion information list for implementing an embodiment of this application.

For example, FIG. 7 shows a plurality of neighboring blocks of the current block. Spatially neighboring blocks include A0, A1, B0, B1, and B2, and temporally neighboring blocks include C and T. A process of obtaining the first candidate motion information set in this application may include:

(1) Obtain the motion information of the at most four spatially neighboring blocks of the current block for constructing the merge candidate motion information list.

The motion information of the spatially neighboring blocks A1, B1, B0, and A0 is sequentially obtained. In this process, availability and repeatability of each spatially neighboring block need to be checked. Availability indicates that the spatially neighboring block exists and has already been encoded/decoded by using an inter prediction mode. Repeatability means that the motion information of the spatially neighboring block is different from motion information that has already been added to the first candidate motion information set. For example, A1 is available, and no motion information is added to the first candidate motion information set when repeatability of A1 is checked. Therefore, motion information of A1 is added to the first candidate motion information set. B1 is available, and motion information of B1 is different from the motion information of A1. Therefore, the motion information of B1 may be added to the first candidate motion information set. B0 is available, and motion information of B0 is the same as the motion information of B1. Therefore, the motion information of B0 is not used to construct the merge candidate motion information list, that is, the motion information of B0 is not added to the first candidate motion information set. A0 is unavailable. Therefore, the motion information of A0 is not used to construct the merge candidate motion information list, that is, the motion information of A0 is not added to the first candidate motion information set.

After the spatially neighboring blocks A1, B1, B0, and A0 are checked, if a quantity of pieces of motion information in the first candidate motion information set is less than a preset threshold, as in the foregoing example, after the motion information of A1 and B1 is added to the first candidate motion information set, the quantity of pieces of motion information in the first candidate motion information set is 2, assuming that the preset threshold is 6, availability and repeatability of B2 may be further checked. For example, B2 is available, and motion information of B2 is different from the motion information of A1 and B1. Therefore, the motion information of B2 may be added to the first candidate motion information set.

It should be noted that the current block has five spatially neighboring blocks in total. However, motion information of at most four spatially neighboring blocks can be obtained in this operation for constructing the merge candidate motion information list. Therefore, even if all the five spatially neighboring blocks of the current block are available and the motion information is not repeated, motion information of only four spatially neighboring blocks is obtained. To be specific, availability and repeatability of the five spatially neighboring blocks are checked sequentially, and a subsequent spatially neighboring block does not need to be checked after it is determined that four pieces of motion information are added to the first candidate motion information set.

(2) Obtain the motion information of the at most one temporally neighboring block of the current block for constructing the merge candidate motion information list.

Motion information of the temporally neighboring blocks T and C is sequentially obtained. In this process, availability of each temporally neighboring block also needs to be checked. Availability indicates that the temporally neighboring block exists and has already been encoded/decoded by using an inter prediction mode. For example, T is available. Therefore, the motion information of T may be added to the first candidate motion information set. If T is unavailable, the motion information of T is not used for constructing the merge candidate motion information list, that is, the motion information of T is not added to the first candidate motion information set. In this case, availability checking may be performed on the temporally neighboring block C.

It should be noted that the current block has two temporally neighboring blocks in total. However, motion information of only one temporally neighboring block can be obtained in this operation for constructing the merge candidate motion information list. Therefore, even if the two temporally neighboring blocks of the current block are available, motion information of only at most one temporally neighboring block is obtained. To be specific, availability and repeatability of the two temporally neighboring blocks are checked sequentially, and a subsequent temporally neighboring block does not need to be checked after it is determined that one piece of motion information is added to the first candidate motion information set. In addition, if neither of the two temporally neighboring blocks of the current block is used for constructing the merge candidate motion information list, the motion information of the temporally neighboring blocks of the current block does not need to be added to the first candidate motion information set.

Operation 602: When a quantity of pieces of motion information in the first candidate motion information set is less than the preset threshold, obtain first motion information based on the motion information in the first candidate motion information set.

Operation 603: When the first motion information is different from all the motion information in the first candidate motion information set, add the first motion information to the first candidate motion information set, to obtain a second candidate motion information set.

The preset threshold is a preset maximum quantity of pieces of motion information that can be added to the merge candidate motion information list. For example, if the preset threshold is 6, it indicates that a finally constructed merge candidate motion information list includes six pieces of motion information.

In this application, two pieces of corresponding motion information may be selected from the first candidate motion information set based on a specified combination manner, and the first motion information may be obtained based on the two pieces of selected motion information.

For example, the motion information may include at least one of the following: a motion vector, a prediction direction, and a reference frame index. Therefore, a method for obtaining the first motion information based on the two pieces of selected motion information may include the following.

It is assumed that the first candidate motion information set includes four pieces of motion information with corresponding indexes 0, 1, 2, and 3, and the preset combination manner includes {(0, 1)}. Therefore, two pieces of motion information whose indexes are 0 and 1 are selected from the first candidate motion information set. p0 represents the $0^{th}$ piece of motion information, mvLXp0 represents a motion vector in p0, refIdxLXp0 represents a reference frame index in p0, and predFlagLXp0 represents a prediction direction in p0. p1 represents the $1^{st}$ piece of motion information, mvLXp1 represents a motion vector in p1, refIdxLXp1 represents a reference frame index in p1, and predFlagLXp1 represents a prediction direction in p1. A value of X may be 0 (corresponding to a list 0) or 1 (corresponding to a list 1). For example, if a type of an image or a slice in which the current block is located is B, the value of X may be 0 or 1. Otherwise, the value of X is 0.

(1) If both predFlagLXp0 and predFlagLXp1 are 1, a motion vector in the first motion information is an average value of mvLXp0 and mvLXp1 (calculating an average value of components x of mvLXp0 and mvLXp1, to obtain a component x of the motion vector in the first motion information, and calculating an average value of components y of mvLXp0 and mvLXp1 to obtain a component y of the motion vector in the first motion information); a reference frame index refIdxLXavg in the first motion information is refIdxLXp0; and a prediction direction predFlagLXavg in the first motion information is 1.

(2) If predFlagLXp0 is 1 and predFlagLXp1 is 0, a motion vector in the first motion information is mvLXp0, a reference frame index refIdxLXavg in the first motion information is refIdxLXp0, and a prediction direction in the first motion information is 1.

(3) If predFlagLXp0 is 0 and predFlagLXp1 is 1, a motion vector in the first motion information is mvLXp1, a reference frame index refIdxLXavg in the first motion information is refIdxLXp1, and a prediction direction in the first motion information is 1.

(4) If both predFlagLXp0 and predFlagLXp are 0, a motion vector in the first motion information is 0, a reference frame index refIdxLXavg in the first motion information is −1, and a prediction direction in the first motion information is 0.

For example, the motion vector in the first motion information in the foregoing (1) is an average value of two selected motion vectors. It should be noted that a weighted average value of the two selected motion vectors may be calculated as the first motion vector. However, the first motion vector may be obtained by using another method in this application. This is not limited. For example, the first candidate motion information set includes four motion vectors with corresponding indexes 0, 1, 2, and 3, the preset combination manner includes {(0, 1), (0, 2), (1, 2), (0, 3), (1, 3), (2, 3)}. An average value of every two motion vectors is sequentially calculated based on the preset combination manner. To be specific, an average value of the two motion vectors whose indexes are 0 and 1 is first calculated as the first motion vector, an average value of the two motion vectors whose indexes are 0 and 2 is calculated as the first motion vector, an average value of the two motion vectors whose indexes are 1 and 2 is calculated as the first motion vector, an average value of the two motion vectors whose indexes are 0 and 3 is calculated as the first motion vector, an average value of the two motion vectors whose indexes are 1 and 3 is calculated again as the first motion vector, and finally an average value of the two motion vectors whose indexes are 2 and 3 is calculated as the first motion vector.

It should be noted that not all of the foregoing processes for calculating an average value need to be performed, but an average value of two motion vectors in each combination is sequentially calculated in a preset order as a candidate motion vector, and the process terminates until a candidate motion vector is different from any motion vector in the list.

The motion vector is used as the first motion vector, and the process of attempting to generate a new motion vector terminates.

For example, the method for obtaining the first motion information based on two pieces of selected motion information in this application may further include the following.

Assuming that the first candidate motion information set includes four motion vectors with corresponding indexes 0, 1, 2, and 3, a represents a list 0, and b represents a list 1, motion information included in a list 0 set is 0a, 1a, 2a, and 3a, and motion information included in a list 1 set is 0b, 1b, 2b, and 3b. One piece of motion information is selected from the list 0 set and one piece of motion information is selected from the list 1 set for pairwise combination, to obtain a total of 16 combinations. Then, 12 combinations are left after four repeated combinations {(0a, 0b), (1a, 1b), (2a, 2b), (3a, 3b)} are removed. And then, an optimal combination is selected as the first motion information. A method for selecting the optimal combination may be as follows: calculating a rate-distortion cost corresponding to each combination, and selecting a combination with a minimum rate-distortion cost as the optimal combination. Another method for selecting an optimal combination may alternatively be used, and this is not limited herein.

In addition, at most one piece of motion information may be added to the first candidate motion information set by performing operations 602 and 603. Once a calculation result of a group of motion information in the preset combination manner can be added to the first candidate motion information set, a subsequent combination does not need to be calculated.

Operation 604: When a quantity of pieces of motion information in the second candidate motion information set is less than the preset threshold, obtain an HMVP candidate motion information list, and obtain second motion information based on motion information in the HMVP candidate motion information list.

Operation 605: When the second motion information is different from all the motion information in the second candidate motion information set, add the second motion information to the second candidate motion information set, to obtain a third candidate motion information set.

The quantity of pieces of motion information in the second candidate motion information set obtained by adding the first motion information to the first candidate motion information set does not reach the preset threshold. For example, it is assumed that the preset threshold is 6, three pieces of motion information have already been added to the first candidate motion information set, and the quantity of pieces of motion information in the second candidate motion information set obtained by adding one piece of first motion information is 4, which is less than 6. Therefore, other motion information needs to be further determined for constructing the merge candidate motion information list.

In this application, the HMVP candidate motion information list may be obtained, and motion information is selected from the HMVP candidate motion information list as the second motion information. It should be noted that a quantity of pieces of motion information in the HMVP candidate motion information list needs to be greater than 0. If the quantity of pieces of motion information in the HMVP candidate motion information list is equal to 0, no motion information can be selected from the HMVP candidate motion information list as the second motion information. In this application, a determining threshold, that is, a value obtained by subtracting one from the preset threshold does not need to be additionally set for a quantity of pieces of motion information selected from the HMVP candidate motion information list. In other words, one or more pieces of motion information may be selected from the HMVP candidate motion information list as the second motion information, to make the quantity of pieces of motion information in the second candidate motion information set reach the preset threshold.

The HMVP candidate motion information list includes historical candidate motion information, and the historical candidate motion information is motion information of a previously coded block. In the proposal JVET-K0104, the HMVP candidate motion information list is constructed by using motion information of a coded block in a current frame, and the HMVP candidate motion information list is accessed in a first-in first-out manner. A process of obtaining the HMVP candidate motion information list may include the following operations:

(1) Initialize the HMVP candidate motion information list when slice (SLICE/tile group) encoding/decoding starts, and clear the list.

(2) Encode/decode a current block. If a merge mode or a common inter prediction mode is used for the current block, generate the merge candidate motion information list or a motion vector prediction candidate list, and add historical candidate motion information in the HMVP candidate motion information list to the merge candidate motion information list or the motion vector prediction candidate list.

(3) After the current block is encoded/decoded, use motion information of the current block as new historical candidate motion information, add the motion information of the current block to the HMVP candidate motion information list, and update the HMVP candidate motion information list. First, the motion information of the current block is compared with the historical candidate motion information in the HMVP candidate motion information list by starting from the header of the HMVP candidate motion information list. If a piece of historical candidate motion information is the same as the motion information of the current block, the historical candidate motion information is removed. Then, a size of the HMVP candidate motion information list is checked. If the size of the list exceeds a preset size, historical candidate motion information located at the header of the list is removed. Finally, the motion information of the current block is added to the tail of the HMVP candidate motion information list.

If a piece of motion information selected from the HMVP candidate motion information list is the same as motion information that has already been added to the second candidate motion information set, another piece of motion information is further selected from the HMVP candidate motion information list. If the another piece of motion information is different from motion information that has already been added to the second candidate motion information set, the another piece of motion information is added to the second candidate motion information set. If the another piece of motion information is the same as the motion information that has already been added to the second candidate motion information set, a next piece of motion information is selected from the HMVP candidate motion information list. The selection process terminates until a quantity of pieces of motion information in the third candidate motion information set obtained by adding the selected motion information as the second motion information to the second candidate motion information set reaches the preset threshold.

Operation 606: When the quantity of pieces of motion information in the third candidate motion information set is equal to the preset threshold, use the third candidate motion information set as the merge candidate motion information list.

If the quantity of pieces of motion information in the third candidate motion information set to which the second motion information is added is equal to the preset threshold, it indicates that sufficient motion information in the third candidate motion information set has been obtained as inter prediction candidate. In this case, the third candidate motion information set is the merge candidate motion information list.

In related technologies, after the first candidate motion information set is obtained, the motion information needs to be first selected from the pre-obtained HMVP candidate motion information list for constructing the merge candidate motion information list. Then, the first motion information is determined by using the methods in the foregoing operations 602 and 603. Therefore, to reserve space for the first motion information (that is, it needs to be ensured that a quantity of pieces of motion information in the merge candidate motion information list does not reach the preset threshold before operations 602 and 603, and at least one piece of first motion information can be added to the merge candidate motion information list), motion information may be selected from the HMVP candidate motion information list based on a determining value obtained by subtracting one from the preset threshold. For example, the preset threshold is 6, and three pieces of motion information have already been added to the first candidate motion information set. In this case, at most two pieces of motion information may be selected from the HMVP candidate motion information list to construct the merge candidate motion information list. The remaining space is reserved for the first motion information determined by using the methods in the foregoing operations 602 and 603. However, because the first motion information may be the same as motion information that has already been added to the list, the first motion information cannot be used to construct the merge candidate motion information list. The quantity of pieces of motion information in the merge candidate motion information list still does not reach the preset threshold. In this case, default values is added to the merge candidate motion information list, to make the quantity of pieces of motion information in the merge candidate motion information list reaches the preset threshold. Compared with the motion information selected from the HMVP candidate motion information list, the default values is not conducive to efficient output of inter prediction.

However, in the method of this application, after the first candidate motion information set is obtained, the first motion information is first determined by using the methods in operation 602 and operation 603, and then the second motion information is determined by using the methods in operation 604 and operation 605. If the quantity of pieces of motion information in the third candidate motion information set obtained by adding the first motion information and the second motion information directly reaches the preset threshold, subsequent operations do not need to be performed. This can reduce complexity in constructing the merge candidate motion information list, and avoid a result of low-efficient output resulting from using default values to construct the merge candidate motion information list.

In an embodiment, FIG. 7 is another schematic flowchart of a method for constructing a merge candidate motion information list for implementing an embodiment of this application. The process 700 may be performed by the video encoder 20 or the video decoder 30. The process 700 is described as a series of operations. It should be understood that the operations of the process 700 may be performed in various sequences and/or performed simultaneously, and are not limited to an execution sequence shown in FIG. 7. As shown in FIG. 7, the method for constructing a merge candidate motion information list includes the following operations.

Operation 701: Obtain a first candidate motion information set.

A technical principle of operation 701 in this application is similar to the foregoing operation 601, and details are not described herein again.

Operation 702: When a quantity of pieces of motion information in the first candidate motion information set is less than a preset threshold, obtain first motion information based on the motion information in the first candidate motion information set.

A technical principle of operation 702 in this application is similar to the foregoing operation 602, and details are not described herein again.

Operation 703: When the first motion information is different from all the motion information in the first candidate motion information set, add the first motion information to the first candidate motion information set, to obtain a second candidate motion information set.

A technical principle of operation 703 in this application is similar to the foregoing operation 603, and details are not described herein again.

Operation 704: When a quantity of pieces of motion information in the second candidate motion information set is equal to the preset threshold, use the second candidate motion information set as the merge candidate motion information list.

If the quantity pieces of motion information in the second candidate motion information set to which the first motion information is added is equal to the preset threshold, it indicates that sufficient motion information in the second candidate motion information set has been obtained as inter prediction candidate. In this case, the second candidate motion information set is the merge candidate motion information list.

In this method of this application, after the first candidate motion information set is obtained, the first motion information is determined by using the methods in operations 702 and 703. If the first motion information may be used to construct the merge candidate motion information list, and the quantity of pieces of motion information in the second candidate motion information set obtained by adding the first motion information to the first candidate motion information set directly reaches the preset threshold, subsequent operations do not need to be performed. This can reduce complexity in constructing the merge candidate motion information list, and avoid a result of low-efficiency output resulting from using default values to construct the merge candidate motion information list.

Figure 8A:
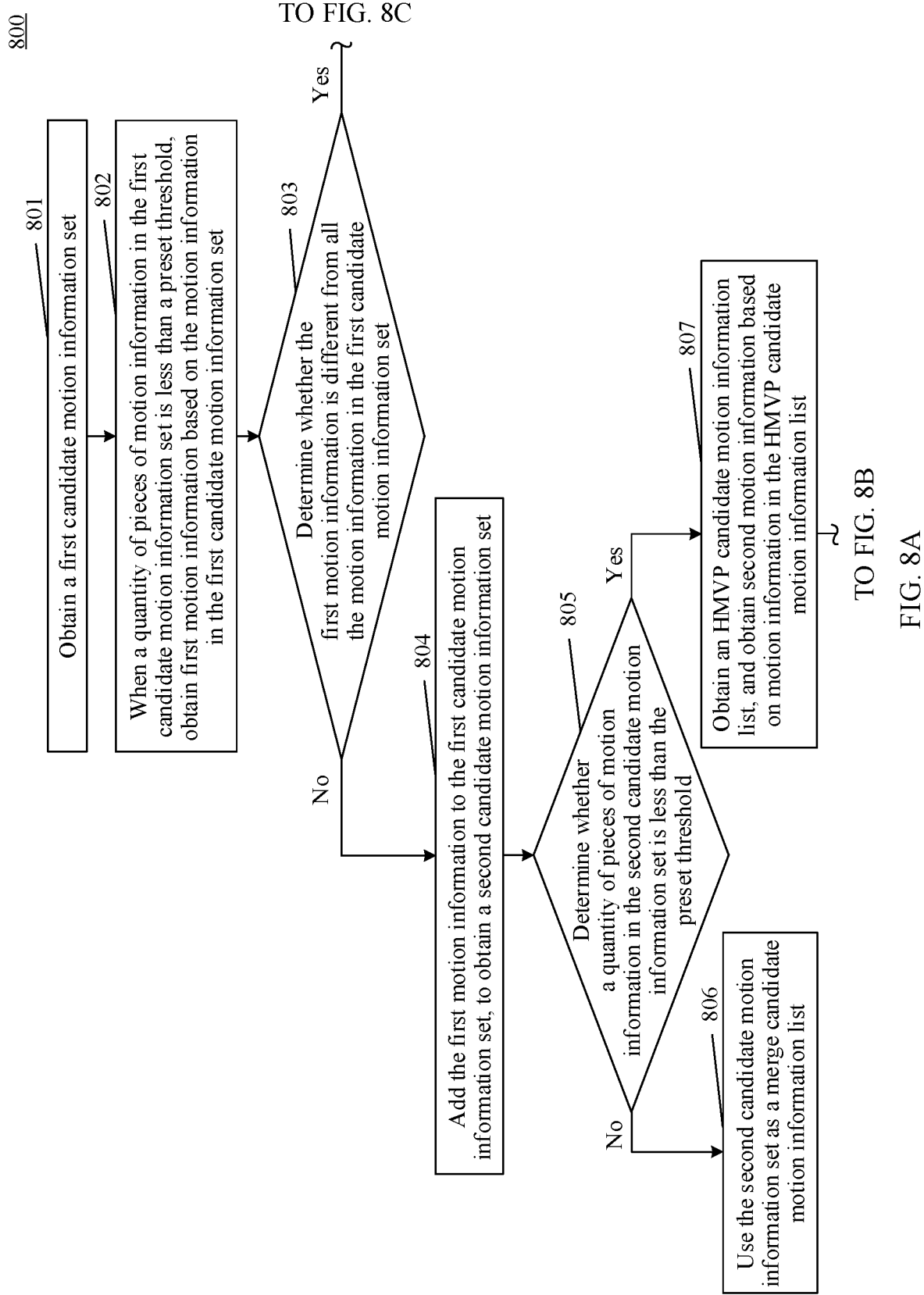
Figure 8B:
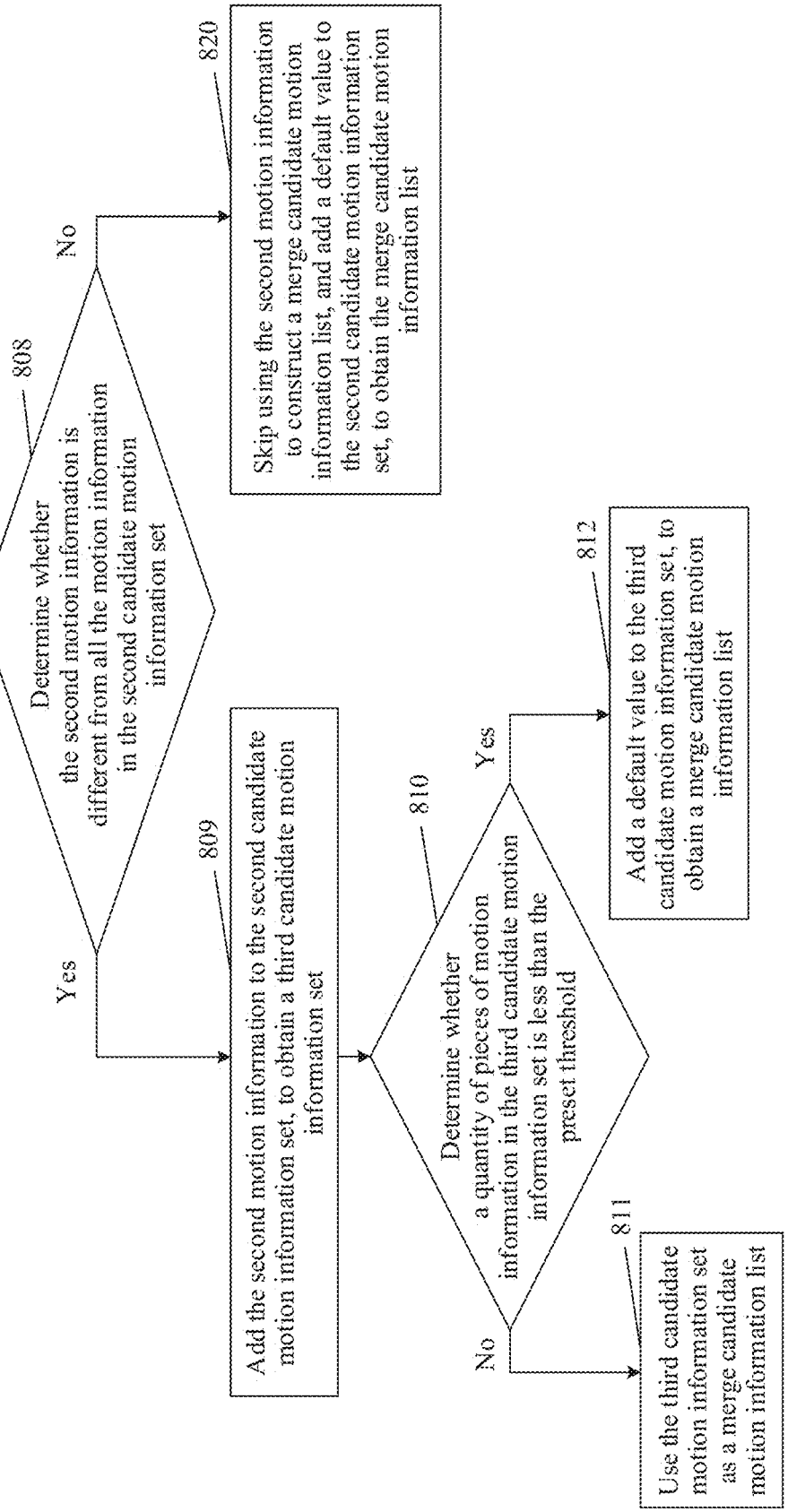

In an embodiment, FIG. 8A to FIG. 8C are still another schematic flowchart of a method for constructing a merge candidate motion information list for implementing an embodiment of this application. The process 800 may be performed by the video encoder 20 or the video decoder 30. The process 800 is described as a series of operations. It should be understood that the operations of the process 800 may be performed in various sequences and/or performed simultaneously, and are not limited to an execution sequence shown in FIG. 8A to FIG. 8C. As shown in FIG. 8A to FIG.

8C, the method for constructing a merge candidate motion information list includes the following operations.

Operation 801: Obtain a first candidate motion information set.

A technical principle of operation 801 in this application is similar to the foregoing operation 601, and details are not described herein again.

Operation 802: When a quantity of pieces of motion information in the first candidate motion information set is less than a preset threshold, obtain first motion information based on the motion information in the first candidate motion information set.

A technical principle of operation 802 in this application is similar to the foregoing operation 602, and details are not described herein again.

Operation 803: Determine whether the first motion information is different from all the motion information in the first candidate motion information set.

If the first motion information is different from all the motion information in the first candidate motion information set, operation 804 is performed. If the first motion information is the same as at least one piece of motion information in the first candidate motion information set, operation 813 is performed.

Operation 804: Add the first motion information to the first candidate motion information set, to obtain a second candidate motion information set.

A technical principle of operation 804 in this application is similar to the foregoing operation 603, and details are not described herein again.

Operation 805: Determine whether a quantity of pieces of motion information in the second candidate motion information set is less than the preset threshold.

If the quantity of pieces of motion information in the second candidate motion information set is equal to the preset threshold, operation 806 is performed. If the quantity of pieces of motion information in the second candidate motion information set is less than the preset threshold, operation 807 is performed.

Operation 806: Use the second candidate motion information set as the merge candidate motion information list.

A technical principle of operation 806 in this application is similar to the foregoing operation 704, and details are not described herein again.

Operation 807: Obtain an HMVP candidate motion information list, and obtain second motion information based on motion information in the HMVP candidate motion information list.

A technical principle of operation 807 in this application is similar to the foregoing operation 604, and details are not described herein again.

Operation 808: Determine whether the second motion information is different from all the motion information in the second candidate motion information set.

If the second motion information is different from all the motion information in the second candidate motion information set, operation 809 is performed. If the second motion information is the same as at least one piece of motion information in the second candidate motion information set, operation 820 is performed.

Operation 809: Add the second motion information to the second candidate motion information set, to obtain a third candidate motion information set.

A technical principle of operation 809 in this application is similar to the foregoing operation 605, and details are not described herein again.

Operation 810: Determine whether a quantity of pieces of motion information in the third candidate motion information set is less than the preset threshold.

If the quantity of pieces of motion information in the third candidate motion information set is equal to the preset threshold, operation 811 is performed. If the quantity of pieces of motion information in the third candidate motion information set is less than the preset threshold, operation 812 is performed.

Operation 811: Use the third candidate motion information set as the merge candidate motion information list.

A technical principle of operation 811 in this application is similar to the foregoing operation 606, and details are not described herein again.

Operation 812: Add default values to the third candidate motion information set, to obtain the merge candidate motion information list.

If the first motion information and the second motion information are used to construct the merge candidate motion information list, that is, if the quantity of motion information in the third candidate motion information set obtained by adding the first candidate motion information set and the second candidate motion information set still does not reach the preset threshold, the list is padded with default values until the quantity of pieces of motion information in the list reaches the preset threshold, that is, until the list is the merge candidate motion information list. For example, 0 is padded for a motion vector by default, and −1 is padded for a reference frame index by default. It should be noted that in this application, another value may alternatively be used as default values for list padding. This is not limited.

Operation 813: Skip using the first motion information to construct the merge candidate motion information list, obtain an HMVP candidate motion information list, and obtain second motion information based on motion information in the HMVP candidate motion information list.

If the first candidate motion information set includes motion information that is the same as the first motion information, the first motion information cannot be added to the first candidate motion information set. In this case, one or more pieces of motion information are selected from the HMVP candidate motion information list as the second motion information. A technical principle thereof is similar to that of operation 807, and details are not described herein again.

Operation 814: Determine whether the second motion information is different from all the motion information in the first candidate motion information set.

If the second motion information is different from all the motion information in the first candidate motion information set, operation 815 is performed. If the second motion information is the same as at least one piece of motion information in the first candidate motion information set, operation 819 is performed.

Operation 815: Add the second motion information to the first candidate motion information set, to obtain a fourth candidate motion information set.

Operation 816: Determine whether a quantity of pieces of motion information in the fourth candidate motion information set is less than the preset threshold.

If the quantity of pieces of motion information in the fourth candidate motion information set is equal to the preset threshold, operation 817 is performed. If the quantity of pieces of motion information in the fourth candidate motion information set is less than the preset threshold, operation 818 is performed.

Operation 817: Use the fourth candidate motion information set as the merge candidate motion information list.

Operation 818: Add default values to the fourth candidate motion information set, to obtain the merge candidate motion information list.

Operation 819: Skip using the second motion information to construct the merge candidate motion information list, and add default values to the first candidate motion information set, to obtain the merge candidate motion information list.

Operation 820: Skip using the second motion information to construct the merge candidate motion information list, and add default values to the second candidate motion information set, to obtain the merge candidate motion information list.

It should be noted that, if a quantity of pieces of motion information in a list to which the first motion information and/or the second motion information is added does not reach the preset threshold, the list needs to be padded with default values until a length of the list reaches the preset threshold, that is, until it is determined that the list is the merge candidate motion information list. For example, 0 is padded for a motion vector by default, and −1 is padded for a reference frame index by default. It should be noted that in this application, another value may alternatively be used as default values for list padding. This is not limited.

Figure 9:
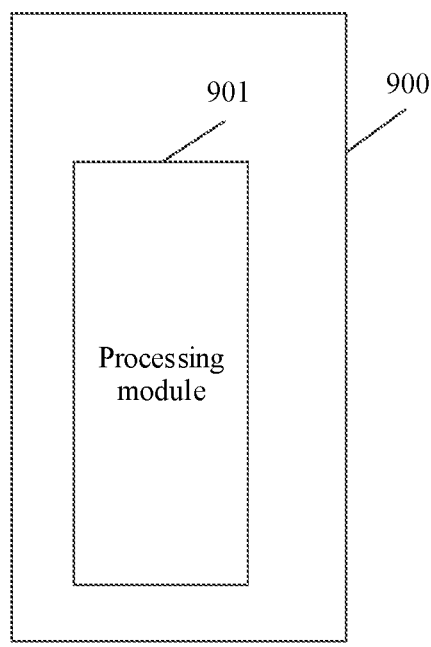
FIG. 9 is a schematic block diagram of an inter prediction apparatus 900 according to an embodiment of this application.

FIG. 9 is a schematic block diagram of an inter prediction apparatus 900 according to an embodiment of this application. Based on a same inventive concept as the foregoing methods, an embodiment of the disclosure further provides an inter prediction apparatus 900. The inter prediction apparatus 900 includes a processing module 901. The processing module 901 is configured to: obtain a first candidate motion information set, where the first candidate motion information set includes motion information of a spatially neighboring block of a current block and/or motion information of a temporally neighboring block of the current block; when a quantity of pieces of motion information in the first candidate motion information set is less than a preset threshold, obtain first motion information based on the motion information in the first candidate motion information set; when the first motion information is different from all the motion information in the first candidate motion information set, add the first motion information to the first candidate motion information set, to obtain a second candidate motion information set; when a quantity of pieces of motion information in the second candidate motion information set is less than the preset threshold, obtain a history-based motion vector prediction (HMVP) candidate motion information list, and obtain second motion information based on motion information in the HMVP candidate motion information list; when the second motion information is different from all the motion information in the second candidate motion information set, add the second motion information to the second candidate motion information set, to obtain a third candidate motion information set; and when a quantity of pieces of motion information in the third candidate motion information set is equal to the preset threshold, use the third candidate motion information set as the merge candidate motion information list.

In an embodiment, the processing module 901 is further configured to: when the quantity of pieces of motion information in the second candidate motion information set is equal to the preset threshold, use the second candidate motion information set as the merge candidate motion information list.

In an embodiment, the processing module 901 is further configured to: when the quantity of pieces of motion information in the third candidate motion information set is less than the preset threshold, add default values to the third candidate motion information set, to obtain the merge candidate motion information list.

In an embodiment, the processing module 901 is further configured to: when the first motion information is the same as at least one piece of motion information in the first candidate motion information set, skip using the first motion information to construct the merge candidate motion information list; obtain the HMVP candidate motion information list, and obtain the second motion information based on the motion information in the HMVP candidate motion information list; when the second motion information is different from all the motion information in the first candidate motion information set, add the second motion information to the first candidate motion information set, to obtain a fourth candidate motion information set; when a quantity of pieces of motion information in the fourth candidate motion information set is equal to the preset threshold, use the fourth candidate motion information set as the merge candidate motion information list.

In an embodiment, the processing module 901 is further configured to: when the quantity of pieces of motion information in the fourth candidate motion information set is less than the preset threshold, add default values to the fourth candidate motion information set, to obtain the merge candidate motion information list.

In an embodiment, the processing module 901 is further configured to: when the second motion information is the same as at least one piece of motion information in the first candidate motion information set, skip using the second motion information to construct the merge candidate motion information list; and add default values to the first candidate motion information set, to obtain the merge candidate motion information list.

In an embodiment, the processing module 901 is further configured to: when the second motion information is the same as at least one piece of motion information in the second candidate motion information set, skip using the second motion information to construct the merge candidate motion information list; and add default values to the second candidate motion information set, to obtain the merge candidate motion information list.

In an embodiment, the processing module 901 is configured to: select two pieces of motion information from the first candidate motion information set that are determined based on a preset combination manner, and obtain the first motion information based on the two pieces of motion information.

In an embodiment, when the motion information is a motion vector, the first motion information is a first motion vector, the processing module 901 is configured to use an average value of the two motion vectors as the first motion vector.

In an embodiment, the processing module 901 is configured to select motion information from the HMVP candidate motion information list as the second motion information.

It should be noted that the processing module 901 may be used in an inter prediction process on an encoder side or a decoder side. On the encoder side, the module may be used in the inter prediction unit 244 in the prediction processing unit 260 of the encoder 20; and on the decoder side, the module may be used in the inter prediction unit 344 in the prediction processing unit 360 of the decoder 30.

It should be further noted that, for a specific implementation process of the processing module 901, refer to the detailed descriptions of the embodiments in FIG. 6 to FIG. 8C. For brevity of the specification, details are not described herein again.

A person skilled in the art can understand that, the functions described with reference to various illustrative logical blocks, modules, and algorithm operations disclosed and described in this specification can be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communication protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of instructions or a data structure and that is accessible by a computer. In addition, any connection is properly referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of the computer-readable media.

Instructions may be executed by one or more processors such as one or more digital signal processors (DSPs), general-purpose microprocessors, application-specific integrated circuits (ASICs), field programmable gate arrays (FPGAs), or other equivalent integrated circuits or discrete logic circuits. Therefore, the term "processor" used in this specification may be any one of the foregoing structures or any other structure suitable for implementing the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, the descriptions in the embodiments have respective focuses. For a part that is not described in detail in an embodiment, refer to related descriptions in other embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An inter prediction apparatus, comprising:
   one or more processors;
   a memory storing instructions, which when executed by the one or more processors, cause the inter prediction apparatus to perform operations, the operations comprising:
   obtaining a first candidate motion information set, wherein the first candidate motion information set comprises motion information of a spatially neighboring block of a current block and/or motion information of a temporally neighboring block of the current block;
   when a quantity of pieces of motion information in the first candidate motion information set is less than a preset threshold, obtaining first motion information;
   when the first motion information is different from the motion information in the first candidate motion information set, adding the first motion information to the first candidate motion information set, to obtain a second candidate motion information set;
   when a quantity of pieces of motion information in the second candidate motion information set is less than the preset threshold, obtaining a history-based motion vector prediction (HMVP) candidate motion information list, and obtaining second motion information based on motion information in the HMVP candidate motion information list;
   when the second motion information is different from the motion information in the second candidate motion information set, adding the second motion information to the second candidate motion information set, to obtain a third candidate motion information set; and
   when a quantity of pieces of motion information in the third candidate motion information set is equal to the preset threshold, using the third candidate motion information set as a merge candidate motion information list.

2. The inter prediction apparatus according to claim 1, wherein the operations further comprise:
when the quantity of pieces of motion information in the second candidate motion information set is equal to the preset threshold, using the second candidate motion information set as the merge candidate motion information list.

3. The inter prediction apparatus according to claim 1, wherein the operations further comprise:
when the quantity of pieces of motion information in the third candidate motion information set is less than the preset threshold, adding default values to the third candidate motion information set, to obtain the merge candidate motion information list.

4. The inter prediction apparatus according to claim 1, wherein the operations further comprise:
when the first motion information is same as at least one piece of motion information in the first candidate motion information set, skipping using the first motion information to construct the merge candidate motion information list;
obtaining the HMVP candidate motion information list, and obtaining the second motion information based on the motion information in the HMVP candidate motion information list;
when the second motion information is different from the motion information in the first candidate motion information set, adding the second motion information to the first candidate motion information set, to obtain a fourth candidate motion information set; and
when a quantity of pieces of motion information in the fourth candidate motion information set is equal to the preset threshold, using the fourth candidate motion information set as the merge candidate motion information list.

5. The inter prediction apparatus according to claim 4, wherein the operations further comprise:
when the quantity of pieces of motion information in the fourth candidate motion information set is less than the preset threshold, adding default values to the fourth candidate motion information set, to obtain the merge candidate motion information list.

6. The inter prediction apparatus according to claim 4, wherein the operations further comprise:
when the second motion information is same as at least one piece of motion information in the first candidate motion information set, skipping using the second motion information to construct the merge candidate motion information list; and
adding default values to the first candidate motion information set, to obtain the merge candidate motion information list.

7. The inter prediction apparatus according to claim 1, wherein the operations further comprise:
when the second motion information is same as at least one piece of motion information in the second candidate motion information set, skipping using the second motion information to construct the merge candidate motion information list; and
adding default values to the second candidate motion information set, to obtain the merge candidate motion information list.

8. The inter prediction apparatus according to claim 1, wherein the first candidate motion information set comprises at least two pieces of motion information, wherein the operations comprise:
selecting two pieces of motion information from the at least two pieces of motion information in the first candidate motion information set that are determined based on a preset combination manner, and obtaining the first motion information based on the two pieces of motion information.

9. The inter prediction apparatus according to claim 8, wherein the first motion information is a first motion vector, and the two pieces of motion information are two motion vectors; and
wherein the operations comprise using an average value of the two motion vectors as the first motion vector.

10. The inter prediction apparatus according to claim 1, wherein the operations comprise selecting motion information from the HMVP candidate motion information list as the second motion information.

11. The inter prediction apparatus according to claim 4, wherein the operations comprise selecting motion information from the HMVP candidate motion information list as the second motion information.

12. A video encoder, wherein the video encoder is configured to encode an image block, and comprises the inter prediction apparatus according to claim 1, wherein the operations further comprises:
predicting motion information of a current encoding image block based on target candidate motion information that is determined from the merge candidate motion information list;
determining predicted pixel values of the current encoding image block based on the motion information of the current encoding image block;
encoding an index flag of the target candidate motion information into a bitstream, wherein the index flag indicates the target candidate motion information used for the current encoding image block; and
reconstructing the current encoding image block based on the predicted pixel values of the current encoding image block.

13. A video decoder, wherein the video decoder is configured to decode a bitstream to obtain an image block, and comprises the inter prediction apparatus according to claim 1, wherein the operations further comprises:
decoding the bitstream to obtain an index flag, wherein the index flag is used to indicate target candidate motion information of a current decoding image block;
querying, based on the index flag, the merge candidate motion information list for corresponding target candidate motion information to predict motion information of the current decoding image block;
determining predicted pixel values of the current decoding image block based on the motion information of the current decoding image block; and
reconstructing the current decoding image block based on the predicted pixel values of the current encoding image block.

14. A method for constructing a merge candidate motion information list, comprising:
obtaining a first candidate motion information set, wherein the first candidate motion information set comprises motion information of a spatially neighboring block of a current block and/or motion information of a temporally neighboring block of the current block;

when a quantity of pieces of motion information in the first candidate motion information set is less than a preset threshold, obtaining first motion information;

when the first motion information is different from the motion information in the first candidate motion information set, adding the first motion information to the first candidate motion information set, to obtain a second candidate motion information set;

when a quantity of pieces of motion information in the second candidate motion information set is less than the preset threshold, obtaining a history-based motion vector prediction (HMVP) candidate motion information list, and obtaining second motion information based on motion information in the HMVP candidate motion information list;

when the second motion information is different from the motion information in the second candidate motion information set, adding the second motion information to the second candidate motion information set, to obtain a third candidate motion information set; and when a quantity of pieces of motion information in the third candidate motion information set is equal to the preset threshold, using the third candidate motion information set as the merge candidate motion information list.

15. A non-transitory computer-readable storage medium that stores a computer program, which when executed by a processor, causes the processor to perform operations of:

obtaining a first candidate motion information set, wherein the first candidate motion information set comprises motion information of a spatially neighboring block of a current block and/or motion information of a temporally neighboring block of the current block;

when a quantity of pieces of motion information in the first candidate motion information set is less than a preset threshold, obtaining first motion information;

when the first motion information is different from the motion information in the first candidate motion information set, adding the first motion information to the first candidate motion information set, to obtain a second candidate motion information set;

when a quantity of pieces of motion information in the second candidate motion information set is less than the preset threshold, obtaining a history-based motion vector prediction (HMVP) candidate motion information list, and obtaining second motion information based on motion information in the HMVP candidate motion information list;

when the second motion information is different from the motion information in the second candidate motion information set, adding the second motion information to the second candidate motion information set, to obtain a third candidate motion information set; and when a quantity of pieces of motion information in the third candidate motion information set is equal to the preset threshold, using the third candidate motion information set as a merge candidate motion information list.

16. The non-transitory computer-readable storage medium according to claim 15, wherein the processor to perform operations of:

when the quantity of pieces of motion information in the second candidate motion information set is equal to the preset threshold, using the second candidate motion information set as the merge candidate motion information list.

17. The non-transitory computer-readable storage medium according to claim 15, wherein the processor to perform operations of:

when the quantity of pieces of motion information in the third candidate motion information set is less than the preset threshold, adding default values to the third candidate motion information set, to obtain the merge candidate motion information list.

18. The non-transitory computer-readable storage medium according to claim 15, wherein the processor to perform operations of:

when the first motion information is the same as at least one piece of motion information in the first candidate motion information set, skipping using the first motion information to construct the merge candidate motion information list;

obtaining the HMVP candidate motion information list, and obtaining the second motion information based on the motion information in the HMVP candidate motion information list;

when the second motion information is different from the motion information in the first candidate motion information set, adding the second motion information to the first candidate motion information set, to obtain a fourth candidate motion information set; and when a quantity of pieces of motion information in the fourth candidate motion information set is equal to the preset threshold, using the fourth candidate motion information set as the merge candidate motion information list.

19. The non-transitory computer-readable storage medium according to claim 18, wherein the processor to perform operations of:

when the quantity of pieces of motion information in the fourth candidate motion information set is less than the preset threshold, adding default values to the fourth candidate motion information set, to obtain the merge candidate motion information list.

20. The non-transitory computer-readable storage medium according to claim 18, wherein the processor to perform operations of:

when the second motion information is the same as at least one piece of motion information in the first candidate motion information set, skipping using the second motion information to construct the merge candidate motion information list; and adding default values to the first candidate motion information set, to obtain the merge candidate motion information list.

* * * * *